(12) United States Patent
Matsuoka et al.

(10) Patent No.: US 11,888,370 B2
(45) Date of Patent: Jan. 30, 2024

(54) STATOR, MOTOR, COMPRESSOR, AIR CONDITIONER, AND MANUFACTURING METHOD OF STATOR

(71) Applicant: Mitsubishi Electric Corporation, Tokyo (JP)

(72) Inventors: Atsushi Matsuoka, Tokyo (JP); Koji Yabe, Tokyo (JP); Toshio Arai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 455 days.

(21) Appl. No.: 17/273,873

(22) PCT Filed: Oct. 30, 2018

(86) PCT No.: PCT/JP2018/040240
§ 371 (c)(1),
(2) Date: Mar. 5, 2021

(87) PCT Pub. No.: WO2020/089994
PCT Pub. Date: May 7, 2020

(65) Prior Publication Data
US 2021/0320546 A1    Oct. 14, 2021

(51) Int. Cl.
*H02K 3/28* (2006.01)
*H02K 15/02* (2006.01)
(Continued)

(52) U.S. Cl.
CPC ........... *H02K 3/28* (2013.01); *F04C 18/0207* (2013.01); *F04C 29/0085* (2013.01);
(Continued)

(58) Field of Classification Search
CPC ............ H02K 3/28; H02K 1/165; H02K 3/12; H02K 3/345; H02K 3/48; H02K 15/0081;
(Continued)

(56) References Cited

U.S. PATENT DOCUMENTS

| 5,231,324 A | 7/1993 | Kawamura et al. |
| 2004/0004408 A1 | 1/2004 | Yamazaki et al. |

(Continued)

FOREIGN PATENT DOCUMENTS

| CN | 104467231 A | 3/2015 |
| CN | 105099031 A | 11/2015 |

(Continued)

OTHER PUBLICATIONS

Office Action dated Dec. 21, 2021 in connection with counterpart Japanese Patent Application No. 2020-554634, one reference cited therein, as well as a machine English translation.

(Continued)

*Primary Examiner* — Thomas Truong
(74) *Attorney, Agent, or Firm* — POSZ LAW GROUP, PLC

(57) ABSTRACT

A stator includes a stator core having a plurality of slots in a circumferential direction about an axis and having an end surface in a direction of the axis, and a first coil and a second coil of different phases which are wound on the stator core in distributed winding. A winding factor is 1. Each of the first coil and the second coil has winding portions, the number of which corresponds to the number of poles. The winding portions include first and second winding portions adjacent to each other in the circumferential direction. The first and second winding portions are inserted into one slot of the plurality of slots and extend from the one slot to both sides in the circumferential direction on the end surface. The first and second coils are annularly disposed in different positions in a radial direction about the axis on the end surface.

17 Claims, 21 Drawing Sheets

(51) Int. Cl.

| | | |
|---|---|---|
| *F04C 18/02* | (2006.01) | |
| *F04C 29/00* | (2006.01) | |
| *F25B 31/02* | (2006.01) | |
| *H02K 1/16* | (2006.01) | |
| *H02K 3/02* | (2006.01) | |
| *H02K 3/34* | (2006.01) | |
| *H02K 3/48* | (2006.01) | |
| *H02K 15/00* | (2006.01) | |
| *H02K 15/06* | (2006.01) | |

(52) U.S. Cl.
CPC ............ *F25B 31/02* (2013.01); *H02K 1/165* (2013.01); *H02K 3/02* (2013.01); *H02K 3/345* (2013.01); *H02K 3/48* (2013.01); *H02K 15/0081* (2013.01); *H02K 15/024* (2013.01); *H02K 15/065* (2013.01); *F04C 2240/102* (2013.01)

(58) Field of Classification Search
CPC ...... H02K 15/024; H02K 15/065; H02K 3/38; H02K 15/062; H02K 1/22; H02K 15/02; H02K 2213/03; F04C 18/0207; F04C 29/0085; F04C 2240/102; F25B 31/02
See application file for complete search history.

(56) References Cited

U.S. PATENT DOCUMENTS

| | | | | |
|---|---|---|---|---|
| 2005/0110357 | A1* | 5/2005 | Fukasaku ............... | H02K 15/06 310/179 |
| 2020/0067363 | A1* | 2/2020 | Ramet .................... | H02K 3/28 |

FOREIGN PATENT DOCUMENTS

| | | | |
|---|---|---|---|
| EP | 1211781 | A1 | 6/2002 |
| EP | 2056429 | A2 | 5/2009 |
| FR | 3061815 | A1 | 7/2018 |
| JP | S62-230346 | A | 10/1987 |
| JP | S62-178757 | U | 11/1987 |
| JP | H02-065055 | U | 5/1990 |
| JP | H04-156245 | A | 5/1992 |
| JP | 2001-186728 | A | 7/2001 |
| JP | 2004-040897 | A | 2/2004 |
| JP | 2004-194435 | A | 7/2004 |
| JP | 5095276 | A | 9/2012 |
| JP | 2012-210094 | A | 10/2012 |
| JP | 2015015900 | A | 1/2015 |
| JP | 2015-223028 | A | 12/2015 |
| JP | 2017-201845 | A | 11/2017 |
| WO | 2016090727 | A1 | 6/2016 |

OTHER PUBLICATIONS

Extended European Search Report dated Oct. 8, 2021, issued in corresponding European Patent Application No. 18938577.6.
Office Action dated Feb. 8, 2022 in connection with the counterpart Indian Patent Application No. 202127017136.
Office Action dated Dec. 9, 2022 in connection with counterpart Korean Patent Application 10-2021-7009082 (and English machine translation).
International Search Report of the International Searching Authority dated Jan. 22, 2019 for the corresponding International application No. PCT/JP2018/040240 (and English translation).
Office Action dated Oct. 12, 2023 in connection with counterpart Chinese Patent Application No. 201880098227.0 (and English machine translation).

* cited by examiner

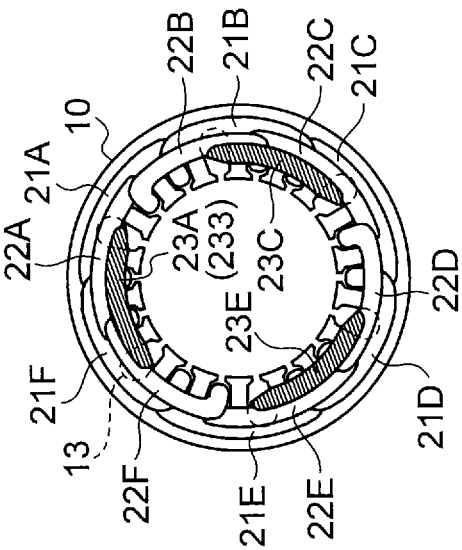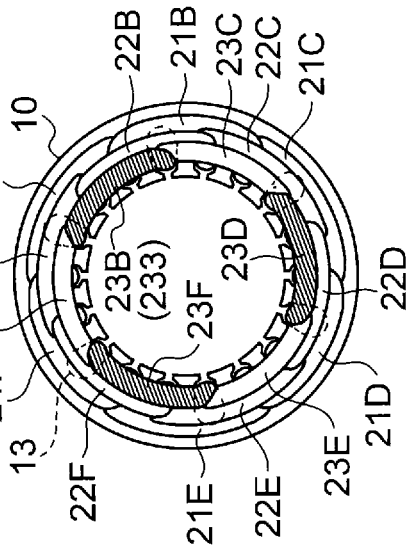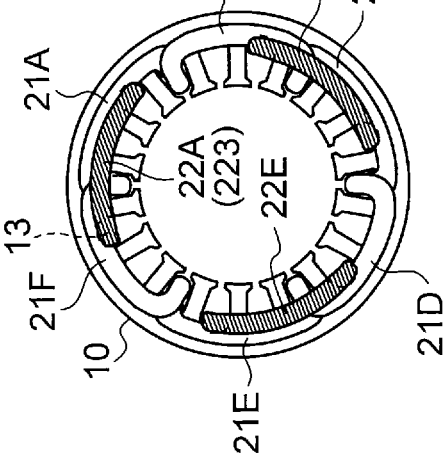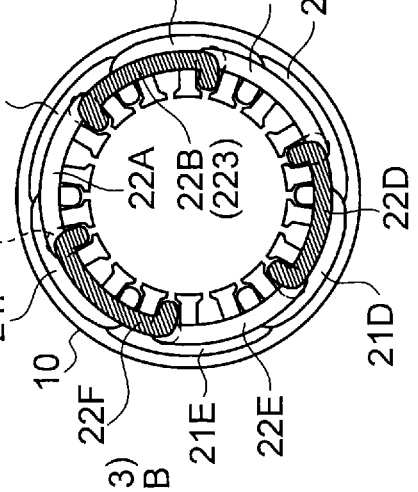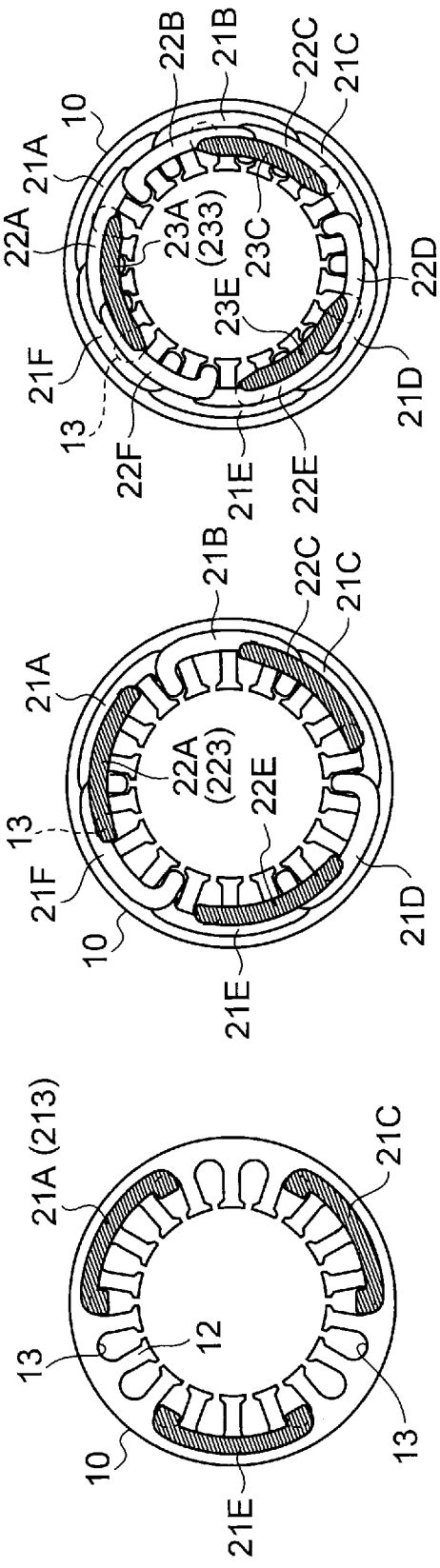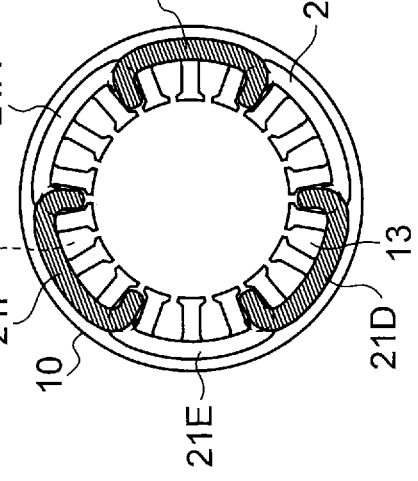

ions, the number of which corresponds to the number of poles, include a first winding portion and a second winding portion that are adjacent to each other in the circumferential direction. The first winding portion and the second winding portion are inserted into one slot of the plurality of slots and extend from the one slot to both sides in the circumferential direction on the end surface. The first coil and the second coil are annularly disposed in different positions in a radial direction about the axis on the end surface of the stator core.

In the present invention, the first winding portion and the second winding portion are inserted into one slot and extend from the slot to both sides in the circumferential direction on the end surface of the stator core. Thus, the coils can be arranged dispersedly in the circumferential direction, and a size of a portion (coil end) protruding outward from the stator core in the axial direction can be reduced. Therefore, a circumference length of each coil can be shortened, and the winding factor can be set to 1, so that the motor efficiency can be improved. Further, since the first coil and the second coil are annularly disposed in different positions in the radial direction, winding of the coils on the stator core is facilitated, and thus the manufacturing cost can be reduced.

STATOR, MOTOR, COMPRESSOR, AIR CONDITIONER, AND MANUFACTURING METHOD OF STATOR

CROSS REFERENCE TO RELATED APPLICATION

This application is a U.S. national stage application of International Application No. PCT/JP2018/040240 filed on Oct. 30, 2018, the contents of which are incorporated herein by reference.

TECHNICAL FIELD

The present invention relates to a stator, a motor, a compressor, an air conditioner, and a manufacturing method of a stator.

BACKGROUND

Winding methods of coils of a stator of a motor include concentrated winding and distributed winding. The distributed winding has an advantage of easily suppressing noise and vibration and is widely used, for example, in motors for compressors. Patent references 1 to 7 disclose various types of stators employing the distributed winding.

PATENT REFERENCE

[PATENT REFERENCE 1] Japanese Patent Application Publication No. 2004-40897
[PATENT REFERENCE 2] Japanese Patent Application Publication No. 2004-194435
[PATENT REFERENCE 3] Japanese Patent Application Publication No. 4-156245
[PATENT REFERENCE 4] Japanese Patent Publication No. 5095276
[PATENT REFERENCE 5] Japanese Patent Application Publication No. 62-230346
[PATENT REFERENCE 6] Japanese Utility Model Application Publication No. 62-178757
[PATENT REFERENCE 7] Japanese Patent Application Publication No. 2001-186728

However, in a conventional stator employing the distributed winding, coil ends tend to be large, and the manufacturing cost tends to be high. When the coil ends are reduced in size, a winding factor decreases, and thus the motor efficiency decreases. Therefore, it is required to improve the motor efficiency while reducing the manufacturing cost.

SUMMARY

The present invention is intended to solve the above-described problems, and an object of the present invention is to improve the motor efficiency while reducing the manufacturing cost.

A stator of the present invention includes a stator core having a plurality of slots in a circumferential direction about an axis and having an end surface in a direction of the axis, and a first coil and a second coil of different phases which are wound on the stator core in distributed winding. A winding factor is 1. Each of the first coil and the second coil has winding portions, the number of which corresponds to the number of poles. The winding portions, the number of which corresponds to the number of poles, include a first winding portion and a second winding portion that are adjacent to each other in the circumferential direction. The

BRIEF DESCRIPTION OF THE DRAWINGS

FIGS. 11(A) to 11(F) are schematic diagrams illustrating a winding process of the U-phase coil, the V-phase coil, and the W-phase coil of the first embodiment.

DETAILED DESCRIPTION

First Embodiment (Configuration of Motor)

Figure 1:
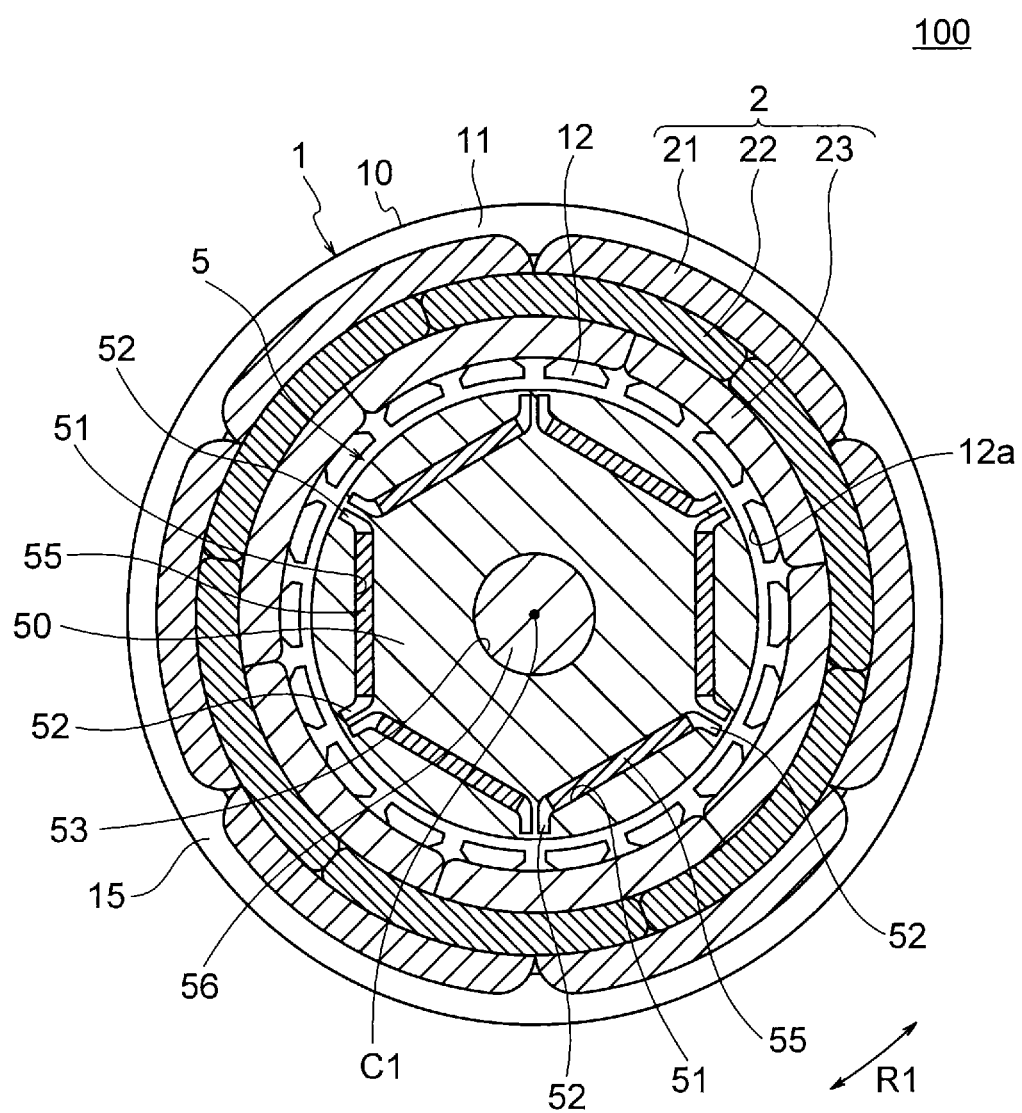
FIG. 1 is a cross-sectional view illustrating a motor of a first embodiment.

FIG. 1 is a cross-sectional view illustrating a motor 100 of a first embodiment. The motor 100 is a synchronous motor and is used, for example, in a compressor 300 (FIG. 22) which will be described later. The motor 100 is a permanent magnet embedded motor that has permanent magnets 55 embedded in a rotor 5.

The motor 100 has a stator 1 and the rotor 5 rotatably provided inside the stator 1. An air gap is provided between the stator 1 and the rotor 5.

Figure 7:
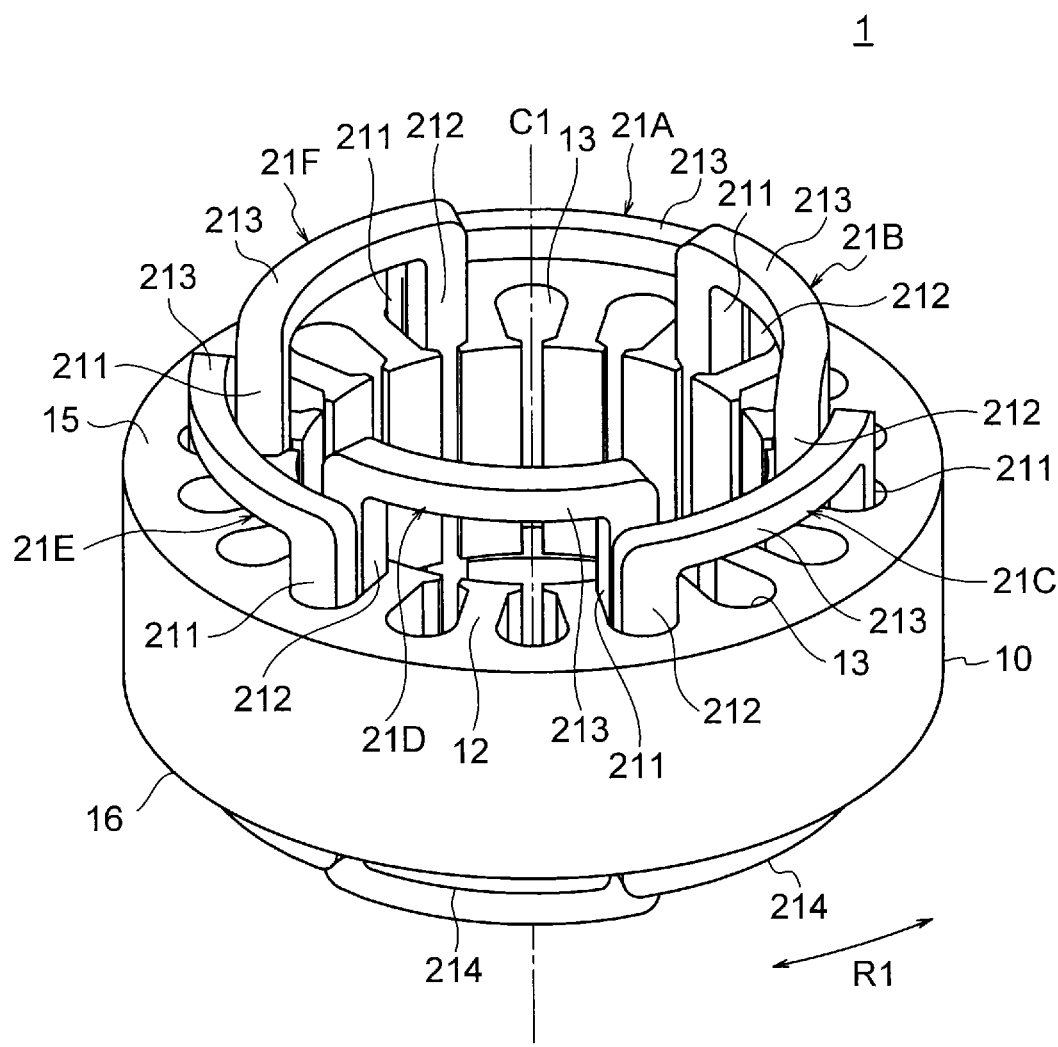
FIG. 7 is a perspective view illustrating a state in which the U-phase coil is attached to the stator core of the first embodiment.

The rotor 5 has a cylindrical rotor core 50 and permanent magnets 55 attached to the rotor core 50. The rotor core 50 is composed of electromagnetic steel sheets, each having a thickness of, for example, 0.1 mm to 0.7 mm, which are stacked in the direction of a rotation axis and integrally fixed together by crimping or the like. The rotor core 50 has a cylindrical shape. The rotor core 50 has end surfaces 15 and 16 (the end surface 16 is shown in FIG. 7) on both ends in the direction of the rotation axis.

The rotor core 50 has a circular shaft hole 53 formed at its center in the radial direction. A shaft 56, which is a rotation shaft, is fixed into the shaft hole 53 by press-fitting. An axis C1, which is a central axis of the shaft 56, serves as the rotation axis of the rotor 5.

Hereinafter, a direction of the axis C1 of the shaft 56 is referred to as an "axial direction". A circumferential direction (indicated by the arrow R1 in FIG. 1 and other figures) about the axis C1 is referred to as a "circumferential direction". A radial direction about the axis C1 is referred to as a "radial direction".

A plurality of magnet insertion holes 51 are formed along an outer circumference of the rotor core 50 at equal intervals in the circumferential direction. The number of magnet insertion holes 51 is six in this example. Each magnet insertion hole 51 passes through the rotor core 50 in the axial direction. The magnet insertion hole 51 extends linearly along the outer circumferential surface of the rotor core 50.

The permanent magnet 55 is disposed inside the magnet insertion hole 51. The permanent magnet 55 is a flat plate-shaped member, and has a rectangular cross-sectional shape perpendicular to the axial direction. The permanent magnet 55 has a width in the circumferential direction and has a thickness in the radial direction. One permanent magnet 55 is disposed in one magnet insertion hole 51. However, a plurality of permanent magnets 55 may be disposed in one magnet insertion hole 51.

The number of poles of the rotor 5 is the number of the magnet insertion holes 51 and is six in this example. The number of poles of the rotor 5 is not limited to six, but may be two or more.

A center of the magnet insertion hole 51 in the circumferential direction is a pole center. In this example, the magnet insertion hole 51 extends in a direction perpendicular to a straight line in the radial direction that passes through the pole center (also referred to as a magnetic pole center-line). A portion between adjacent magnet insertion holes 51 is an inter-pole portion.

The permanent magnet 55 is made of a rare earth sintered magnet that contains, for example, neodymium (Nd), iron (Fe) and boron (B). The permanent magnet 55 is not limited to the rare earth magnet and may be, for example, a ferrite magnet.

Each permanent magnet 55 is magnetized so that its outer side and inner side in the radial direction have opposite magnetic poles. The permanent magnets 55 adjacent to each other in the circumferential direction have opposite magnetic poles on the outer circumferential side. The cross-sectional shape of the permanent magnet 55 is not limited to the rectangular shape described above and may be an arc-shape, for example.

A flux barrier 52 is formed on each of both ends of the magnet insertion hole 51 in the circumferential direction. The flux barrier 52 is a hole for suppressing leakage magnetic flux between adjacent magnetic poles (i.e., magnetic flux flowing through the inter-pole portion).

(Configuration of Stator)

Figure 2:
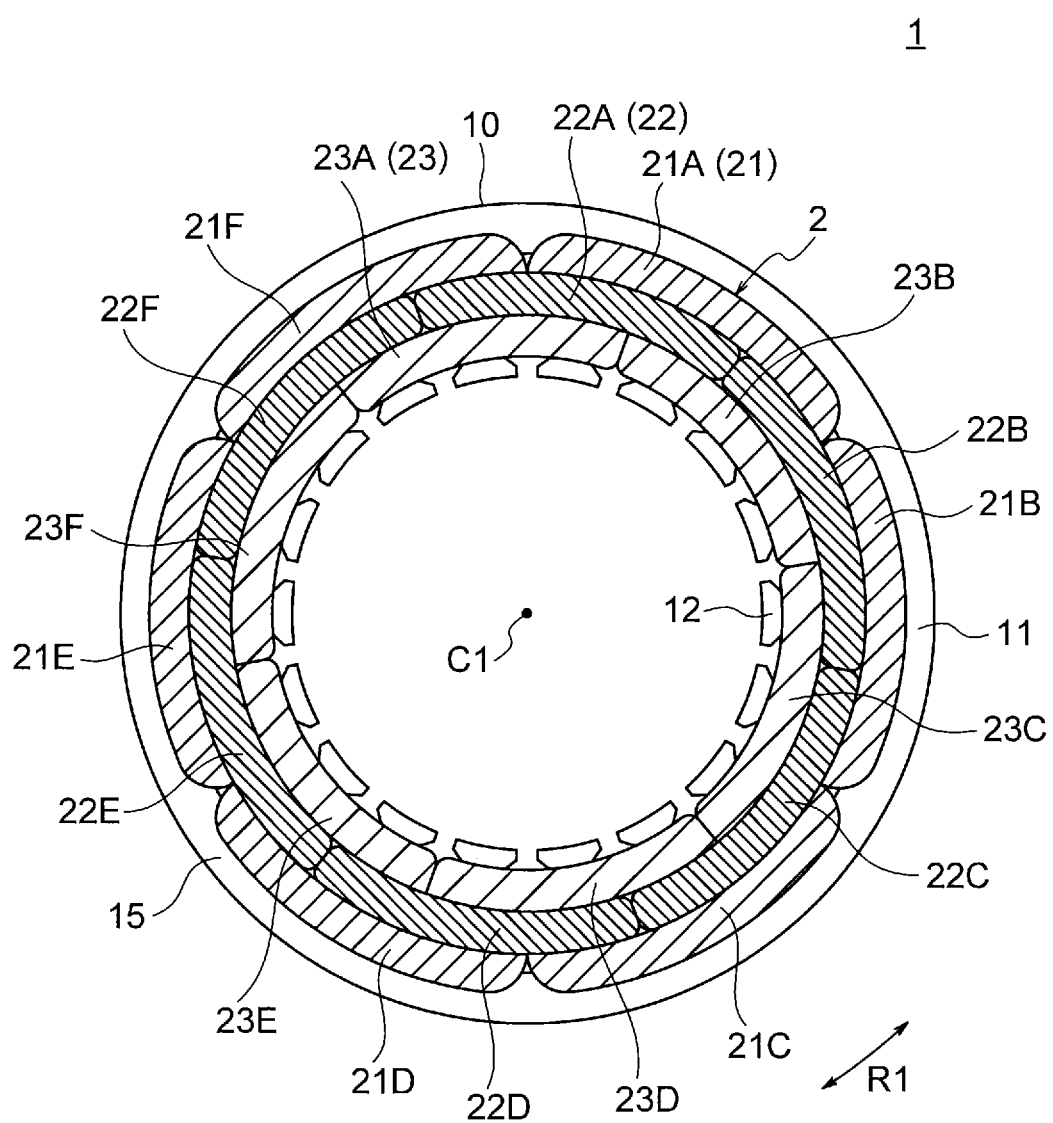
FIG. 2 is a cross-sectional view illustrating a stator of the first embodiment.

FIG. 2 is a cross-sectional view illustrating the stator 1. The stator 1 has a stator core 10 and coils 2 wound on the stator core 10 in wave winding. The stator core 10 is composed of electromagnetic steel sheets, each having a thickness of, for example, 0.1 mm to 0.7 mm, which are stacked in the axial direction and integrally fixed together by crimping or the like.

Figure 3:
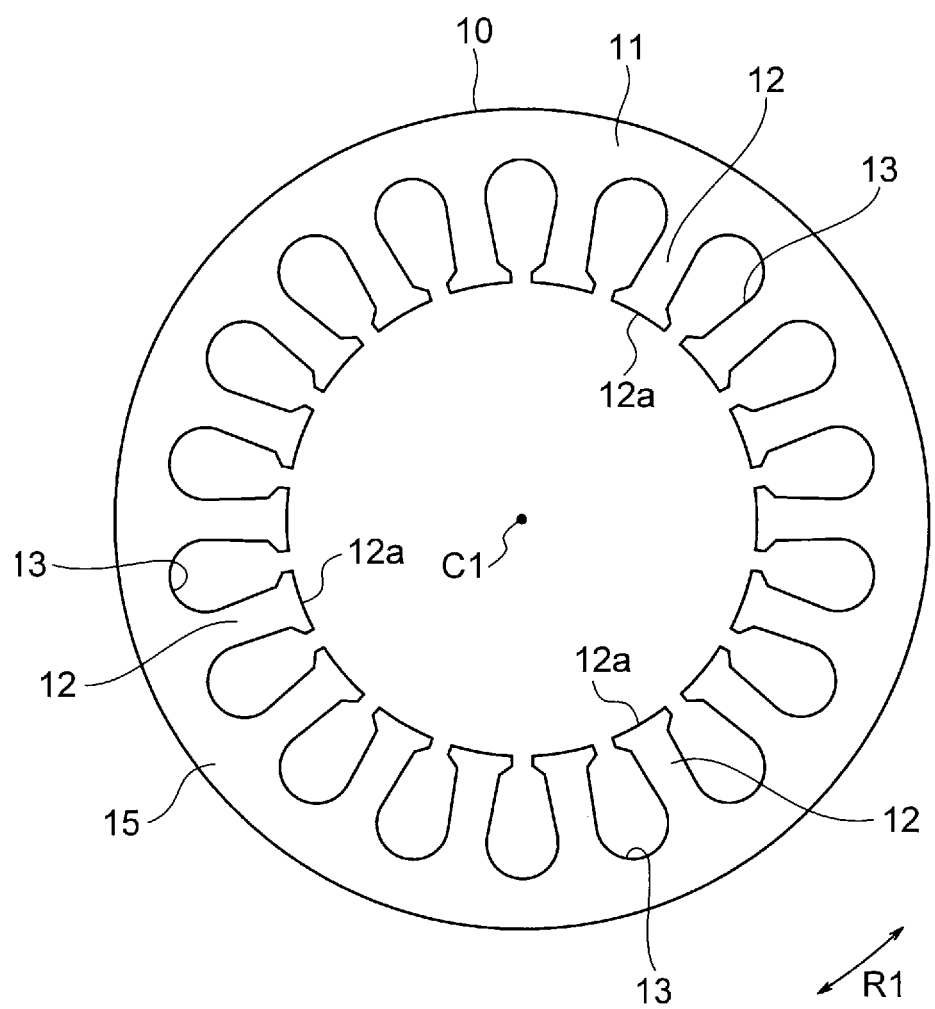
FIG. 3 is a plan view illustrating a stator core of the first embodiment.

FIG. 3 is a plan view illustrating the stator core 10. The stator core 10 has an annular yoke 11 and a plurality of teeth 12 extending inward in the radial direction from the yoke 11. In an example illustrated in FIG. 1, the number of teeth 12 is 18. Each tooth 12 has a tip end portion 12a on its inner side in the radial direction, and the tip end portion 12a faces the outer circumferential surface of the rotor 5.

A slot 13 is formed between the teeth 12 adjacent to each other in the circumferential direction. The slot 13 is a portion in which the coil 2 wound around the tooth 12 is accommodated. The number of slots 13 (i.e., slot number) is the same as the number of teeth 12, and is 18 in this example. A not shown insulating portion is provided between the slot 13 and the coil 2.

With reference to FIG. 2, the coils 2 wound on the stator core 10 include a U-phase coil 21 as a first coil, a V-phase coil 22 as a second coil, and a W-phase coil 23 as a third coil.

Each of the U-phase coil 21, the V-phase coil 22, and the W-phase coil 23 is disposed annularly about the axis C1. Positions of the U-phase coil 21, the V-phase coil 22 and the W-phase coil 23 in the radial direction are different from each other. More specifically, the U-phase coil 21 is located outermost in the radial direction, the V-phase coil 22 is located inside the U-phase coil 21 in the radial direction, and the W-phase coil 23 is located innermost in the radial direction.

The U-phase coil 21 has six U-phase winding portions 21A, 21B, 21C, 21D, 21E, and 21F in the circumferential direction. The V-phase coil 22 has six V-phase winding portions 22A, 22B, 22C, 22D, 22E, and 22F in the circumferential direction. The W-phase coil 23 has six W-phase winding portions 23A, 23B, 23C, 23D, 23E, and 23F in the circumferential direction.

The term "winding portion" refers to a portion including two slot insertion portions inserted into the slots 13 (for example, straight portions 211 and 212 to be described later) and at least one coil end (for example, a coil end 213 to be described later).

The number of winding portions per phase, i.e., the number of winding portions of each of the U-phase coil 21, V-phase coil 22 and W-phase coil 23, corresponds to the number of poles of the stator 1. The number of poles of the stator 1 is the number of magnetic fields respectively generated by the coils 21, 22 and 23. In a synchronous motor, the number of poles of the stator 1 is the same as the number of poles of the rotor 5. In this example, the number of poles of the stator 1 is six.

A value obtained by dividing the number of slots by the product of the number of poles and the number of phases is referred to as the number of slots per pole per phase (NSPP). When the number of slots is 18, the number of poles is six, and the number of phases is three, the number of slots per phase per pole is 1.

Figure 4:
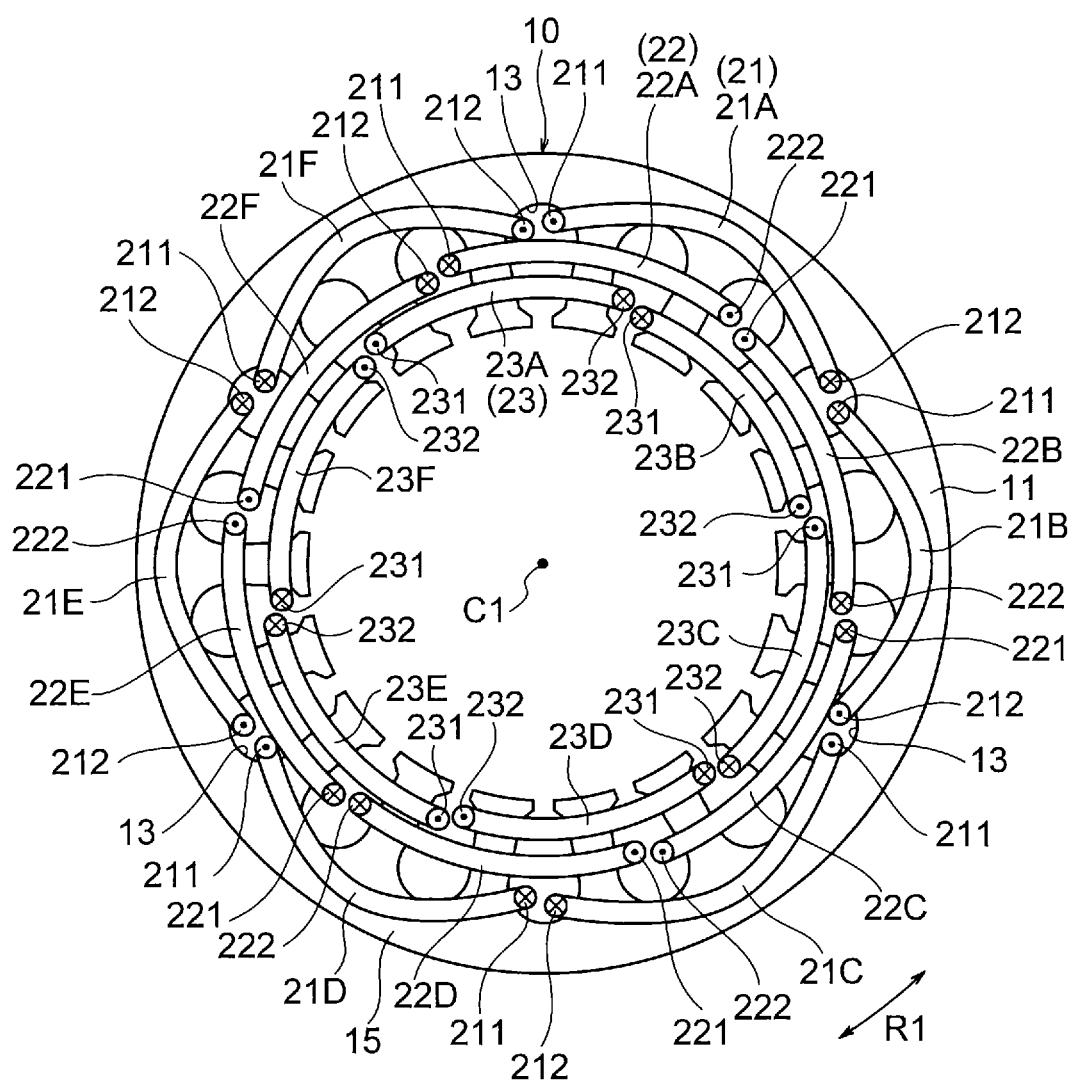
FIG. 4 is a plan view illustrating the stator core and coils of the first embodiment.

FIG. 4 is a plan view illustrating the stator core 10 and the coils 2 (i.e., the U-phase coil 21, the V-phase coil 22, and the W-phase coil 23). The U-phase winding portions 21A to 21F are arranged every three slots in the circumferential direction. Each of the U-phase winding portions 21A to 21F is wound to span three teeth 12. A coil pitch is 60 degrees (mechanical angle), i.e., three slots.

More specifically, the U-phase winding portion 21A has a straight portion (i.e., slot insertion portion) 211 inserted into one slot 13 and a straight portion (i.e., slot insertion portion) 212 inserted into a third slot 13 from the above-described slot 13 in the clockwise direction in the figure.

The U-phase winding portion 21B has a straight portion 211 inserted into the slot 13 which is the same as the slot 13 into which the straight portion 212 of the U-phase winding portion 21A is inserted, and a straight portion 212 inserted into a third slot 13 from the above-described slot 13 in the clockwise direction in the figure.

The U-phase winding portion 21C has a straight portion 211 inserted into the slot 13 which is the same as the slot 13 into which the straight portion 212 of the U-phase winding portion 21B is inserted, and a straight portion 212 inserted into a third slot 13 from the above-described slot 13 in the clockwise direction in the figure.

The U-phase winding portions 21D, 21E, and 21F are arranged in the same manner. Thus, the straight portion 212 of the U-phase winding portion 21F is inserted into the same slot 13 as the slot 13 into which the straight portion 211 of the U-phase winding portion 21A is inserted.

Among these U-phase winding portions 21A to 21F, the U-phase winding portions 21A, 21C, and 21E (the first winding portions) are located on the outer side in the radial direction with respect to the U-phase winding portions 21B, 21D, and 21F (the second winding portions).

The V-phase winding portions 22A to 22F are arranged every three slots in the circumferential direction. Each of the V-phase winding portions 22A to 22F is wound to span three teeth 12. A coil pitch is 60 degrees (mechanical angle), i.e., three slots.

More specifically, the V-phase winding portion 22A has a straight portion 221 inserted into a slot 13 adjacent counterclockwise in the figure to the slot 13 into which the straight portion 211 of the U-phase winding portion 21A is inserted, and a straight portion 222 inserted into a third slot 13 from the above-described slot 13 in the clockwise direction in the figure.

The V-phase winding portion 22B has a straight portion 221 inserted into the slot 13 which is the same as the slot 13 into which the straight portion 222 of the V-phase winding portion 22A is inserted, and a straight portion 222 inserted into a third slot 13 from the above-described slot 13.

The V-phase winding portion 22C has a straight portion 221 inserted into the slot 13 which is the same as the slot 13 into which the straight portion 222 of the V-phase winding portion 22B is inserted, and a straight portion 222 inserted into a third slot 13 from the above-described slot 13.

The V-phase winding portions 22D, 22E, and 22F are also arranged in the same manner. Thus, the straight portion 222 of the V-phase winding portion 22F is inserted into the same slot 13 as the slot 13 into which the straight portion 221 of the V-phase winding portion 22A is inserted.

Among these V-phase winding portions 22A to 22F, the V-phase winding portions 22A, 22C, and 22E (the first winding portions) are located on the outer side in the radial direction with respect to the V-phase winding portions 22B, 22D, and 22F (the second winding portions).

The W-phase winding portions 23A to 23F are arranged every three slots in the circumferential direction. Each of the W-phase winding portions 23A to 23F is wound to span three teeth 12. A coil pitch is 60 degrees (mechanical angle), i.e., three slots.

More specifically, the W-phase winding portion 23A has a straight portion 231 inserted into a slot 13 adjacent counterclockwise in the figure to the slot 13 into which the straight portion 221 of the V-phase winding portion 22A is inserted and a straight portion 232 inserted into a third slot 13 from the above-described slot 13 in the clockwise direction in the figure.

The W-phase winding portion 23B has a straight portion 231 inserted into the slot 13 which is the same as the slot 13 into which the straight portion 232 of the W-phase winding portion 23A is inserted, and a straight portion 232 inserted into a third slot 13 from the above-described slot 13.

The W-phase winding portion 23C has a straight portion 231 inserted into the slot 13 which is the same as the slot 13 into which the straight portion 232 of the W-phase winding portion 23B is inserted, and a straight portion 232 inserted into a third slot 13 counted from the above-described slot 13.

The W-phase winding portions 23D, 23E, and 23F are arranged in the same manner. Thus, the straight portion 232 of the W-phase winding portion 23F is inserted into the same slot 13 as the slot 13 into which the straight portion 231 of the W-phase winding portion 23A is inserted.

Among these W-phase winding portions 23A to 23F, the W-phase winding portions 23A, 23C, and 23E (the first winding portions) are located on the outer side in the radial direction with respect to the W-phase winding portions 23B, 23D, and 23F (the second winding portions).

Figure 5:
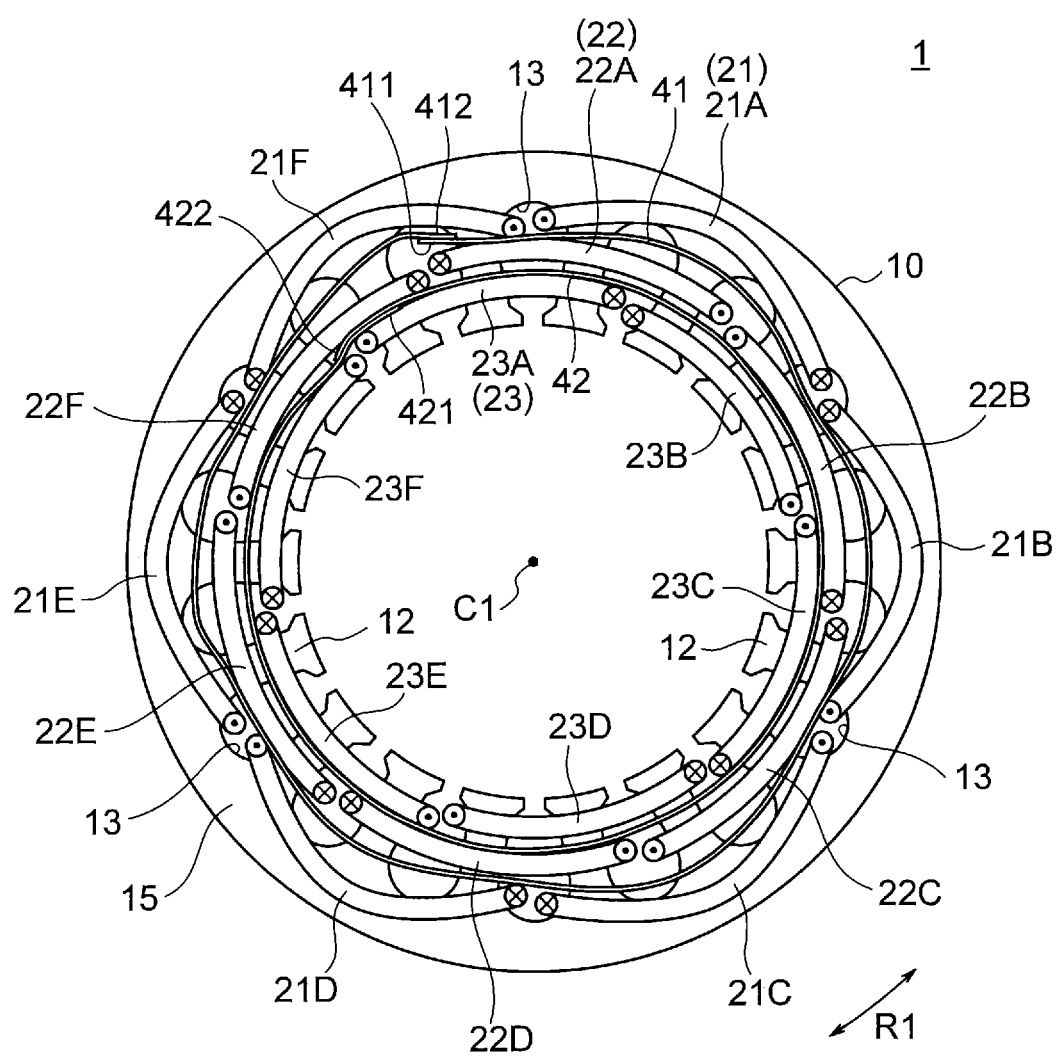
FIG. 5 is a plan view illustrating the stator core, the coils, and insulating films of the first embodiment.

FIG. 5 is a plan view illustrating the stator core 10, the coils 2, and insulating films 41 and 42. The insulating film 41 is disposed between the U-phase coil 21 and the V-phase coil 22 so as to electrically insulate the coils 21 and 22. The insulating film 42 is disposed between the V-phase coil 22 and the W-phase coil 23 so as to electrically insulate the coils 22 and 23.

Each of the insulating films 41 and 42 is made of an insulating resin such as polyethylene terephthalate (PET). Each of the insulating films 41 and 42 is a strip-shaped film that has a width in the axial direction, and is disposed on the end surface 15 of the stator core 10.

The insulating film 41 is located between the U-phase coil and the V-phase coil 22 in the radial direction and is disposed annularly about the axis C1. One end 411 and the other end 412 of the insulating film 41 in the longitudinal direction overlap each other and are fixed together.

The insulating film 42 is located between the V-phase coil and the W-phase coil 23 in the radial direction and is disposed annularly about the axis C1. One end 421 and the other end 422 of the insulating film 42 in the longitudinal direction overlap each other and are fixed together.

Although FIG. 5 illustrates the insulating films 41 and 42 on one end surface 15 of the stator core 10, another insulating film 41 and another insulating film 42 are arranged on the other end surface 16 (FIG. 7) of the stator core 10. That is, the U-phase coil 21, the V-phase coil 22, and the W-phase coil 23 can be electrically insulated from one another with a total of four insulating films 41 and 42.

Figure 6:
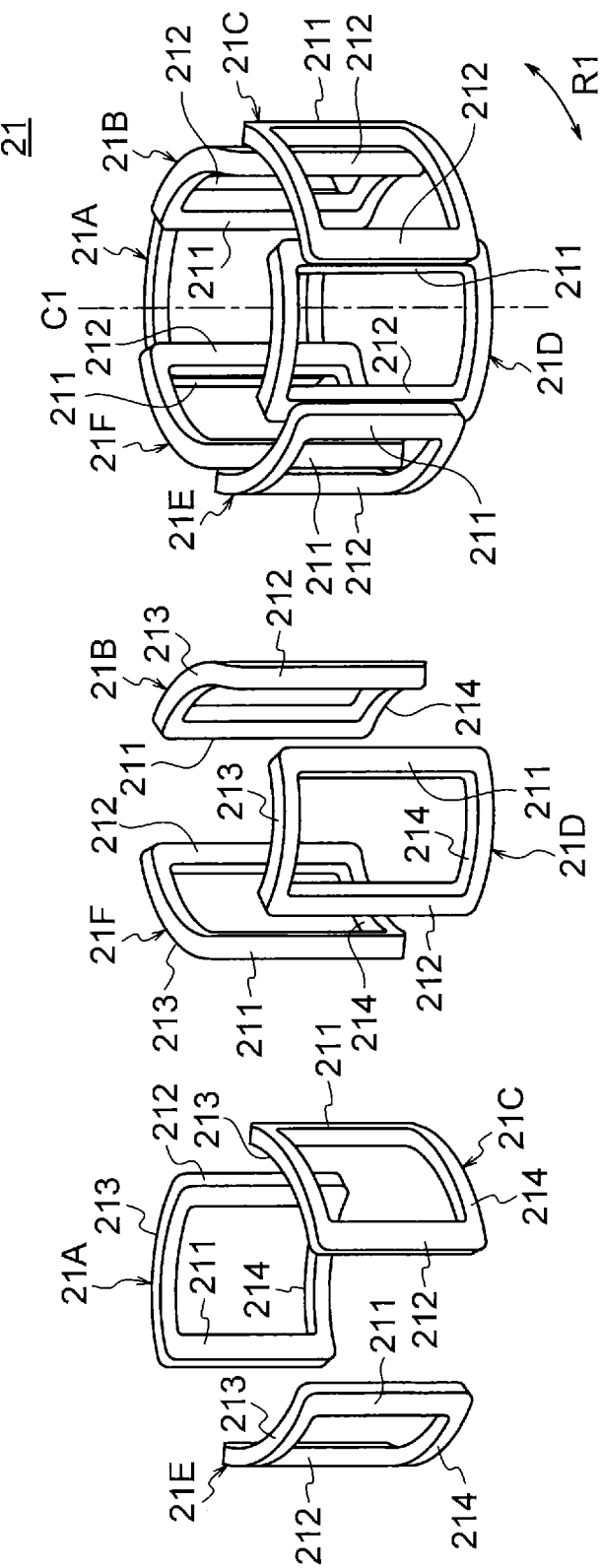
FIG. 6(A) is a perspective view illustrating a first winding portion of a U-phase coil of the first embodiment.
FIG. 6(B) is a perspective view illustrating a second winding portion of the U-phase coil.
FIG. 6(C) is a perspective view illustrating a combination of these winding portions.

FIG. 6(A) is a perspective view illustrating the U-phase winding portions 21A, 21C, and 21E, and FIG. 6(B) is a perspective view illustrating the U-phase winding portions 21B, 21D, and 21F. FIG. 6(C) is a perspective view illustrating the U-phase wiring portions 21A to 21F.

As shown in FIG. 6(A), the U-phase winding portions 21A, 21C, and 21E are arranged at intervals of 120 degrees about the axis C1. Each of the U-phase winding portions 21A, 21C, and 21E has the straight portions 211 and 212 extending in the axial direction, the coil end 213 connecting one end of the straight portion 211 and one end of the straight portion 212 (upper ends of the straight portions shown in the figure), and a coil end 214 connecting the other end of the straight portion 211 and the other end of the straight portion 212 (lower ends of the straight portions in the figure). Each of the straight portions 211 and 212 and the coil ends 213 and 214 is composed of a bundle of copper wires.

As shown in FIG. 6(B), the U-phase winding portions 21B, 21D, and 21F are arranged at intervals of 120 degrees in the circumferential direction. Each of the U-phase winding portions 21B, 21D, and 21F has the straight portions 211 and 212 extending in the axial direction, the coil end 213 connecting one end of the straight portion 211 and one end of the straight portion 212 (upper ends of the straight portions shown in the figure), and the coil end 214 connecting the other end of the straight portion 211 and the other end of the straight portion 212 (lower ends of the straight portions in the figure). Each of the straight portions 211 and 212 and the coil ends 213 and 214 is composed of a bundle of copper wires.

As shown in FIG. 6(C), the U-phase winding portions 21A to 21F are arranged at intervals of 60 degrees in the circumferential direction, and the U-phase winding portions 21A, 21C, and 21E are located on the outer side in the radial direction with respect to the U-phase winding portions 21B, 21D, and 21F. That is, the straight portions 211 and 212 of the U-phase winding portions 21A, 21C, and 21E are located on the inner side in the radial direction with respect to the straight portions 211 and 212 of the U-phase winding portions 21B, 21D, and 21F.

The U-phase winding portions 21B, 21D, and 21F have lengths in the axial direction (i.e., lengths of the straight portions 211 and 212) longer than lengths of the U-phase winding portions 21A, 21C, and 21E in the axial direction. In other words, the U-phase winding portions 21B, 21D, and 21F protrude on both sides in the axial direction from the U-phase winding portions 21A, 21C, and 21E.

FIG. 7 is a perspective view illustrating a state in which the U-phase winding portions 21A to 21F are wound on the stator core 10. The U-phase winding portions 21A to 21F are previously wound in the shapes illustrated in FIGS. 6(A) and 6(B) and then inserted into the slots 13 of the stator core 10 by a known inserter.

The inserter is an automatic winding apparatus that has pawls of the same number as the slots 13. The winding portions of the coils are hung over the pawls, and the pawls are moved along the tip end portions 12a of the teeth 12 from one side in the axial direction, so that the winding portions are accommodated inside the slots 13.

The straight portions 211 and 212 of the U-phase winding portions 21A, 21C, and 21E are disposed on the outer side in the radial direction in the slots 13. The straight portions 211 and 212 of the U-phase winding portions 21B, 21D, and 21F are disposed on the inner side in the radial direction with respect to the straight portions 211 and 212 of the U-phase winding portions 21A, 21C, and 21E in the slots 13.

The coil ends 213 of the U-phase winding portions 21A to 21F extend in the circumferential direction on the end surface 15 of the stator core 10, while the coil ends 214 of the U-phase winding portions 21A to 21F extend in the circumferential direction on the end surface 16 of the stator core 10.

Since the U-phase winding portions 21A, 21C, and 21E are located on the outer side in the radial direction with respect to the U-phase winding portions 21B, 21D, and 21F, it is possible to first insert the U-phase winding portions 21A, 21C, and 21E into the slots 13 and then insert the U-phase winding portions 21B, 21D, and 21F into the slots 13.

In this example, since two adjacent winding portions (for example, the U-phase winding portions 21A and 21B) are inserted in the same slot 13, the winding portions in the same slot 13 may interfere with each other, if the U-phase winding portions 21A to 21F are inserted into the slots 13 at the same time. By first inserting the U-phase winding portions 21A, 21C, and 21E into the slots 13 and then inserting the U-phase winding portions 21B, 21D, and 21F into the slots 13, the interference between the winding portions in the same slot 13 can be avoided.

Two straight portions to be inserted into the same slot 13 (for example, the straight portion 212 of the U-phase winding portion 21A and the straight portion 211 of the U-phase winding portion 21B) may be located in the same position in the circumferential direction as illustrated in FIG. 7, or may be displaced in the circumferential direction as illustrated in FIGS. 4 and 5.

Figure 8:
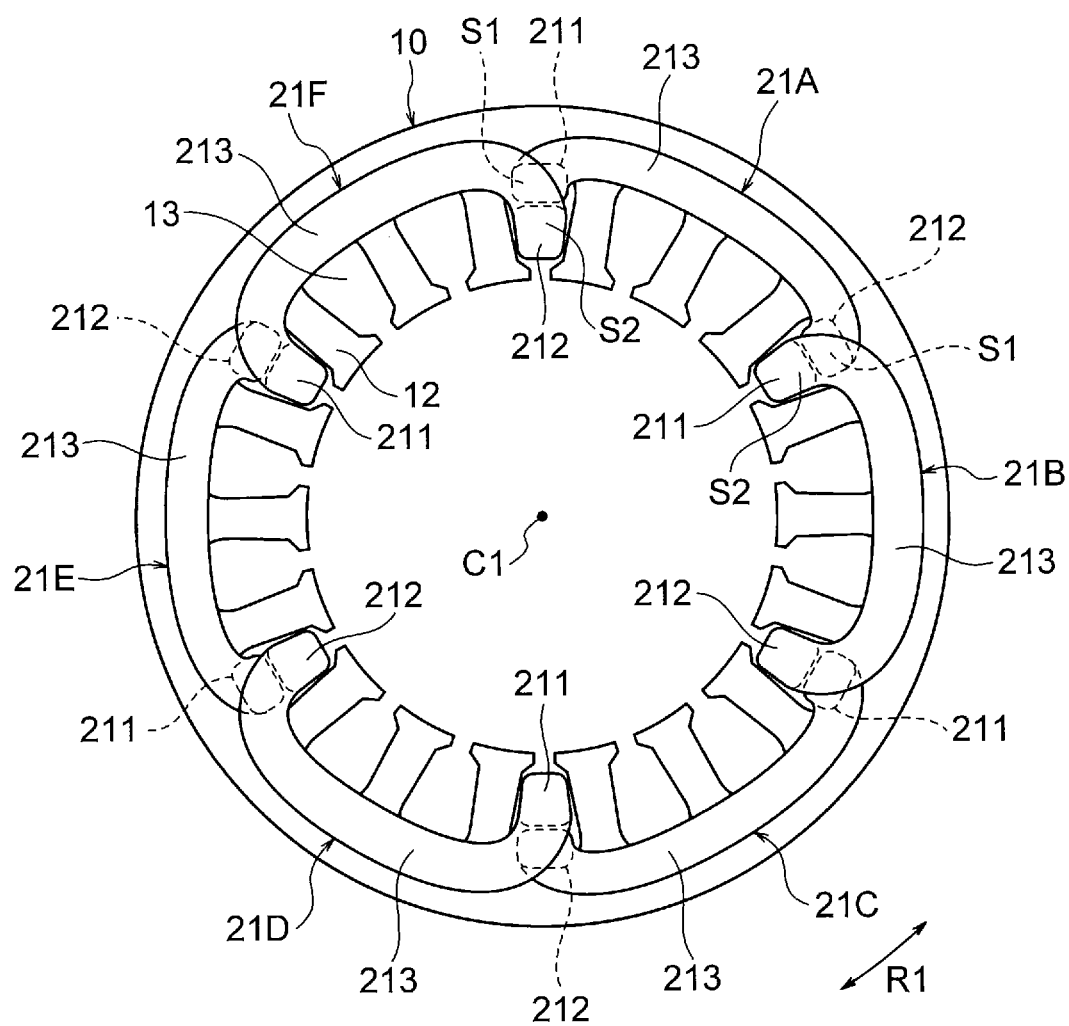
FIG. 8 is a plan view illustrating a state in which the U-phase coil is wound on the stator core of the first embodiment.

FIG. 8 is a plan view illustrating a state in which the coil ends 213 of the U-phase winding portions 21A to 21F are deformed outward in the radial direction from the state illustrated in FIG. 7. As described above, the lengths of the U-phase winding portions 21B, 21D, and 21F in the axial direction are longer than the lengths of the U-phase winding portions 21A, 21C, and 21E in the axial direction.

Therefore, when the coil ends 213 of the U-phase winding portions 21B, 21D, and 21F are deformed outward in the radial direction, the position in the radial direction of each of the coil ends 213 of the U-phase winding portions 21B, 21D, and 21F is the same as the position in the radial direction of each of the coil ends 213 of the U-phase winding portions 21A, 21C, and 21E. In other words, the six coil ends 213 of the U-phase winding portions 21A to 21F are aligned annularly.

FIG. 8 illustrates the coil ends 213 on one end surface 15 of the stator core 10, but the same can be applied to the coil ends 214 on the other end surface 16 (FIG. 7).

Since the length of each of the U-phase winding portions 21B, 21D, and 21F in the axial direction is longer than the length of each of the U-phase winding portions 21A, 21C, and 21E in the axial direction, the average circumference length of each of the U-phase winding portions 21B, 21D, and 21F is longer than the average circumference length of each of the U-phase winding portions 21A, 21C, and 21E.

In this case, if the cross-sectional area of each of the U-phase winding portions 21A, 21C, and 21E is equal to the cross-sectional area of each of the U-phase winding portions 21B, 21D, and 21F, the electrical resistance of each of the U-phase winding portions 21A, 21C, and 21E is different from the electrical resistance of each of the U-phase winding portions 21B, 21D, and 21F.

Therefore, in this example, the cross-sectional area S1 of each of the U-phase winding portions 21A, 21C, and 21E is made smaller than the cross-sectional area S2 of each of the U-phase winding portions 21B, 21D, and 21F. The electrical resistance is proportional to the circumference length, but inversely proportional to the cross-sectional area. Thus, the cross-sectional area S1 of each of the U-phase winding portions 21A, 21C, and 21E having shorter average circumference lengths are made smaller than the cross-sectional area S2 of each of the U-phase winding portions 21B, 21D, and 21F having longer average circumference lengths. Accordingly, the electrical resistance of each of the U-phase winding portions 21A, 21C, and 21E can be made closer to the electrical resistance of each of the U-phase winding portions 21B, 21D, and 21F.

Since each of the winding portions 21A to 21F is composed of a bundle of copper wires, each of the cross-sectional areas S1 and S2 is the sum of the cross-sectional areas of the bundle of copper wires in the slot 13. The above-mentioned relationship between the cross-sectional areas S1 and S2 (S1<S2) can also be rephrased that a space factor of each of the U-phase winding portions 21A, 21C, and 21E in the slot 13 is less than a space factor of each of the U-phase winding portions 21B, 21D, and 21F in the slot 13.

FIGS. 6(A) to 8 illustrate the U-phase winding portions 21A to 21F, but the V-phase winding portions 22A to 22F and the W-phase winding portions 23A to 23F are also arranged in the same manner as the U-phase winding portions 21A to 21F. In FIGS. 1 and 2 described above, the cross sections of the coils 21, 22, and 23 at the coil ends 213 are illustrated.

Figure 9A:
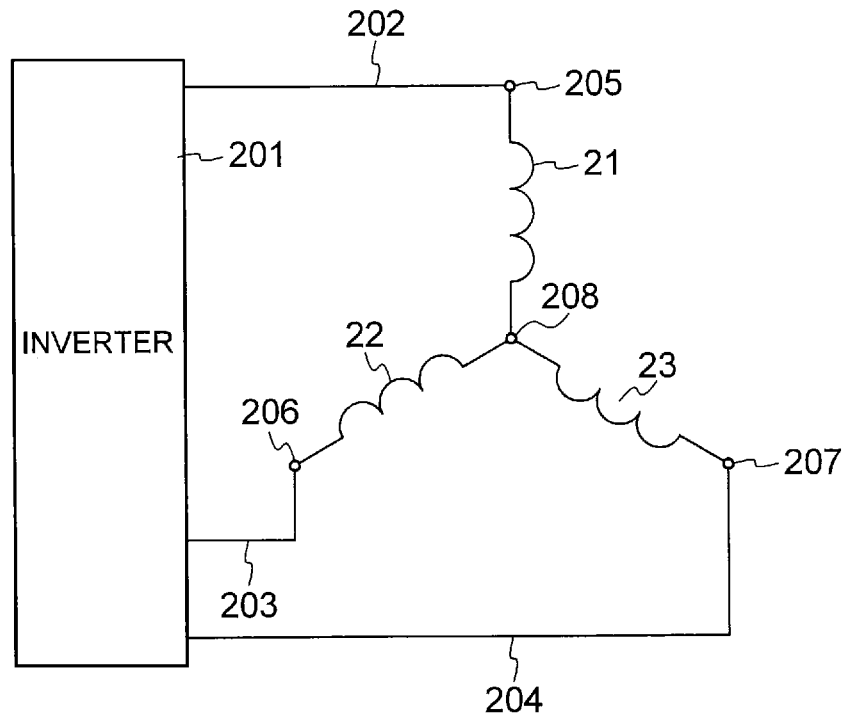
FIG. 9(A) is a schematic diagram illustrating a connected state of the U-phase coil, the V-phase coil, and the W-phase coil of the first embodiment.

FIG. 9(A) illustrates the connected state of the U-phase coil 21, the V-phase coil 22, and the V-phase coil 23. The U-phase coil 21, the V-phase coil 22 and the W-phase coil 23 are connected to each other by Y-connection.

That is, the U-phase coil 21 has one terminal 205 connected to a wiring 202 and the other terminal connected to a neutral point 208. The V-phase coil 22 has one terminal 206 connected to a wiring 203 and the other terminal connected to the neutral point 208. The W-phase coil 23 has one terminal 207 connected to a wiring 204 and the other terminal connected to the neutral point 208. The wirings 202, 203, and 204 are connected to an inverter 201 that drives the motor 100.

Figure 9B:
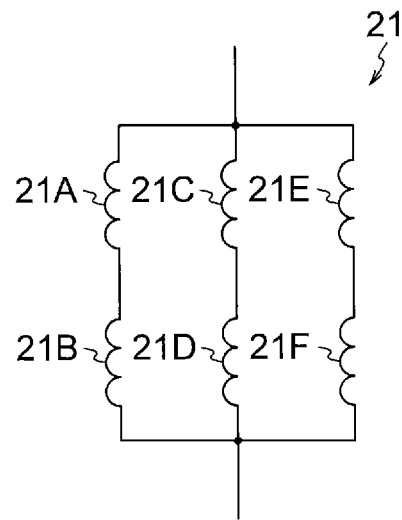
FIG. 9(B) is a schematic diagram illustrating a connected state of the winding portions of the U-phase coil.

FIG. 9(B) is a diagram illustrating an example of the connected state of the U-phase wiring portions 21A to 21F. In this example, a pair of U-phase winding portions 21A and 21B connected in series, a pair of U-phase winding portions 21C and 21D connected in series, and a pair of U-phase winding portions 21E and 21F connected in series are all connected in parallel.

The example illustrated in FIG. 9(B) is one of examples. As another example, a group of U-phase winding portions 21A, 21C, and 21E connected in series and a group of U-phase winding portions 21B, 21D, and 21F connected in series may be connected in parallel.

(Manufacturing Method of Stator)

Figure 10:
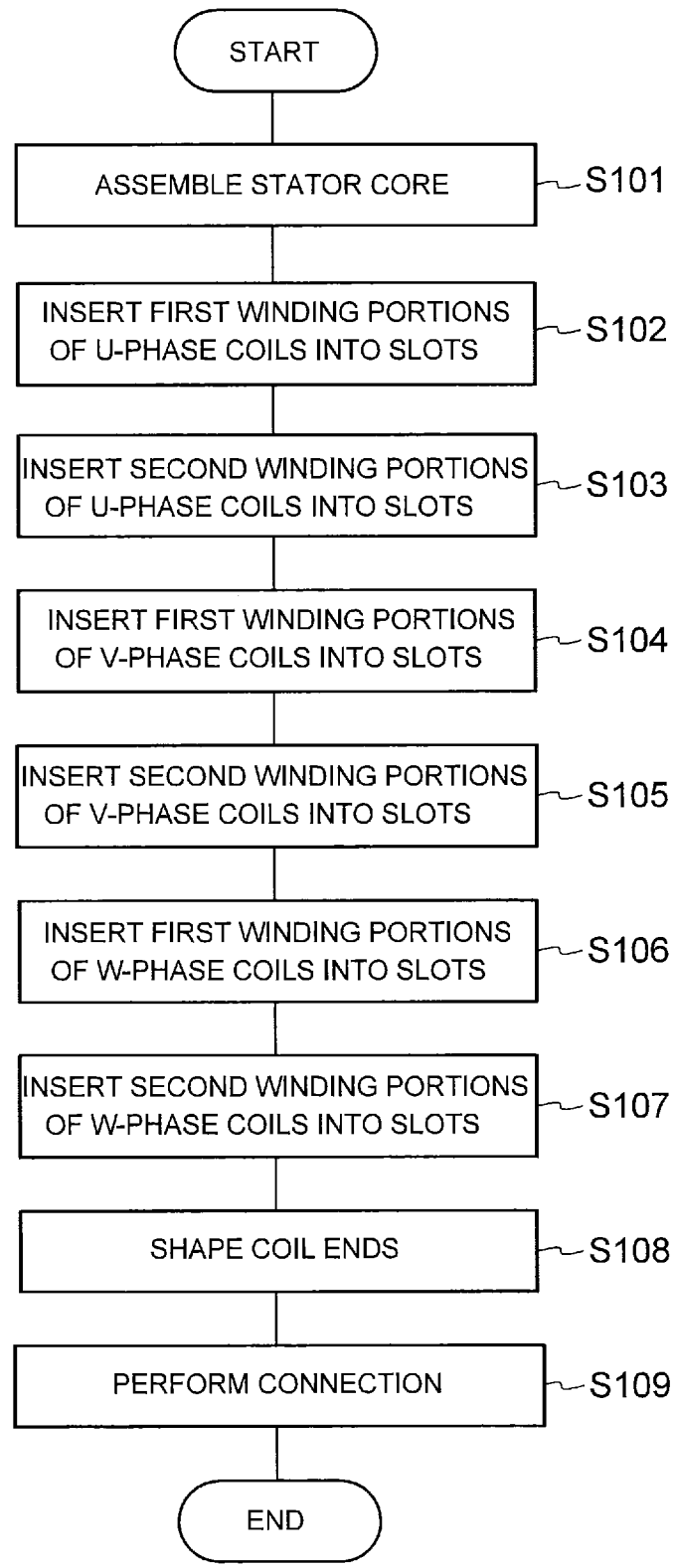
FIG. 10 is a flowchart illustrating a manufacturing process of the stator of the first embodiment.

Next, a manufacturing method of the stator 1 will be described. FIG. 10 is a flowchart illustrating a manufacturing process of the stator 1. FIGS. 11(A) to 11(F) are plan views illustrating steps of a winding process of the coils 2. First, a plurality of electromagnetic steel sheets are stacked in the axial direction and integrally fixed together by crimping or the like to thereby obtain the stator core 10 illustrated in FIG. 3 (step S101).

Then, the U-phase winding portions 21A, 21C, and 21E are inserted into the slots 13 of the stator core 10 by the inserter (step S102). As illustrated in FIG. 11(A), the U-phase winding portions 21A, 21C, and 21E are inserted into the outermost side (back side) in the slots 13 in the radial direction. The coil ends 213 of the U-phase winding portions 21A, 21C, and 21E are deformed outward in the radial direction as indicated by hatching in the figure.

Then, the U-phase winding portions 21B, 21D, and 21F are inserted into the slots 13 of the stator core 10 (step S103). As illustrated in FIG. 11(B), the U-phase winding portions 21B, 21D, and 21F are inserted on the inner side (front side) in the radial direction with respect to the U-phase winding portions 21A, 21C, and 21E in the slots 13. The coil ends 213 of the U-phase winding portions 21B, 21D, and 21F are deformed outward in the radial direction as indicated by hatching in the figure. Subsequently, the insulating film 41 illustrated in FIG. 5 is disposed on the inner side of the U-phase winding portions 21A to 21F in the radial direction.

Then, the V-phase winding portions 22A, 22C, and 22E are inserted into the slots 13 of the stator core 10 (step S104). As illustrated in FIG. 11(C), the V-phase winding portions 22A, 22C, and 22E are inserted into the slots 13 adjacent in the counterclockwise direction to the slots 13 into which the U-phase winding portions 21A to 21F are inserted. The coil ends 223 of the V-phase winding portions 22A, 22C, and 22E are deformed outward in the radial direction as indicated by hatching in the figure.

Then, the V-phase winding portions 22B, 22D, and 22F are inserted into the slots 13 of the stator core 10 (step S105). As illustrated in FIG. 11(D), the V-phase winding portions 22B, 22D, and 22F are inserted on the inner side (front side) in the radial direction with respect to the V-phase winding portions 22A, 22C, and 22E in the slots 13. The coil ends 223 of the V-phase winding portions 22B, 22D, and 22F are deformed outward in the radial direction as indicated by hatching in the figure. Subsequently, the insulating film 42 illustrated in FIG. 5 is disposed on the inner side of the V-phase winding portions 22A to 22F in the radial direction.

Then, the W-phase winding portions 23A, 23C, and 23E are inserted into the slots 13 of the stator core 10 (step S106). As illustrated in FIG. 11(E), the W-phase winding portions 23A, 23C, and 23E are inserted into the slots 13 adjacent in the counterclockwise direction to the slots 13 into which the V-phase winding portions 22A to 22F are inserted. The coil ends 233 of the W-phase winding portions 23A, 23C, and 23E are defamed outward in the radial direction as indicated by hatching in the figure.

Then, the W-phase winding portions 23B, 23D, and 23F are inserted into the slots 13 of the stator core 10 (step S107). As illustrated in FIG. 11(F), the W-phase winding portions 23B, 23D, and 23F are inserted on the inner side (front side) in the radial direction with respect to the W-phase winding portions 23A, 23C, and 23E in the slots 13. The coil ends 233 of the W-phase winding portions 23B, 23D, and 23F are defamed outward in the radial direction as indicated by hatching in the figure.

As above, the insertion of the U-phase coil 21, the V-phase coil 22, and the W-phase coil 23 into the slots 13 of the stator core 10 is completed.

Then, the coil ends 213, 223, and 233 of the coils 21, 22, and 23 are subjected to a shaping process (i.e., are shaped) (step S108). Then, the U-phase coil 21, the V-phase coil 22 and the W-phase coil 23 are connected as illustrated in FIG. 9(A) and 9(B) (step S109). Consequently, the manufacturing of the stator 1 is completed.

In the process described herein, each of the U-phase coil 21, the V-phase coil 22, and the W-phase coil 23 is inserted into the slots 13 in two stages. However, each of the U-phase coil 21, the V-phase coil 22 and the W-phase coil 23 may be inserted into the slots 13 in one stage in the case where the interference between the winding portions is less likely to occur in the slots 13.

Figure 12:
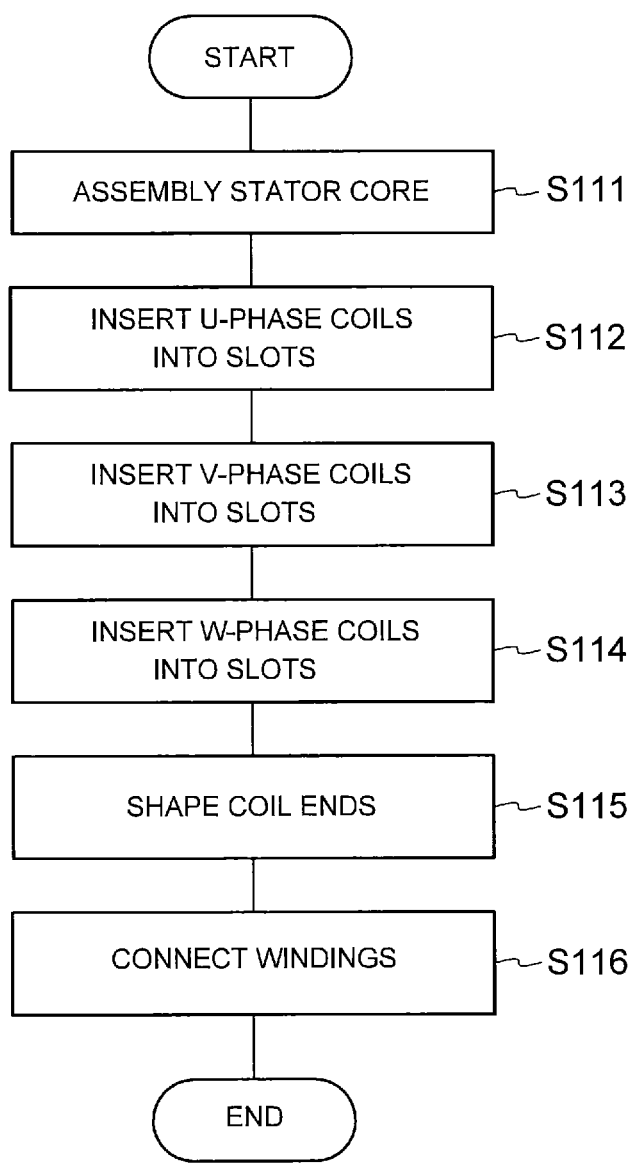
FIG. 12 is a flowchart illustrating another example of the manufacturing process of the stator of the first embodiment.

FIG. 12 is a flowchart illustrating another example of the manufacturing method of the stator 1. First, in the same manner as in step S101 illustrated in FIG. 10, a plurality of electromagnetic steel sheets are stacked in the axial direction and integrally fixed together by crimping or the like to thereby obtain the stator core 10 (step S111).

Then, the U-phase winding portions 21A to 21F are inserted into the slots 13 of the stator core 10 (step S112). The coil ends 213 of the U-phase winding portions 21A to 21F are deformed outward in the radial direction. Subsequently, the insulating film 41 illustrated in FIG. 5 is disposed on the inner side of the U-phase winding portions 21A to 21F in the radial direction.

Then, the V-phase winding portions 22A to 22F are inserted into the slots 13 of the stator core 10 (step S113). The coil ends 223 of the V-phase winding portions 22A to 22F are deformed outward in the radial direction. Subsequently, the insulating film 42 illustrated in FIG. 5 is disposed on the inner side of the V-phase winding portions 22A to 22F in the radial direction.

Then, the W-phase winding portions 23A to 23F are inserted into the slots 13 of the stator core 10 (step S114). The coil ends 223 of the V-phase winding portions 22A to 22F are deformed outward in the radial direction. As above, the insertion of the U-phase coil 21, the V-phase coil 22, and the W-phase coil 23 into the slots 13 of the stator core 10 is completed.

Subsequently, in the same manner as in steps S108 and S109 illustrated in FIG. 10, the coil ends 213, 223, and 233 are shaped (step S115), and then the U-phase coil 21, the V-phase coil 22, and the W-phase coil 23 are connected (step S116). Consequently, the manufacturing of the stator 1 is completed.

(Operation)

Next, the operation of the first embodiment will be described. First, Comparative Examples 1 to 3 to be compared with the first embodiment will be described with reference to FIGS. 13 to 15. For convenience of description, some components of Comparative Examples are denoted with the same reference signs as the components of the first embodiment.

Figure 13:
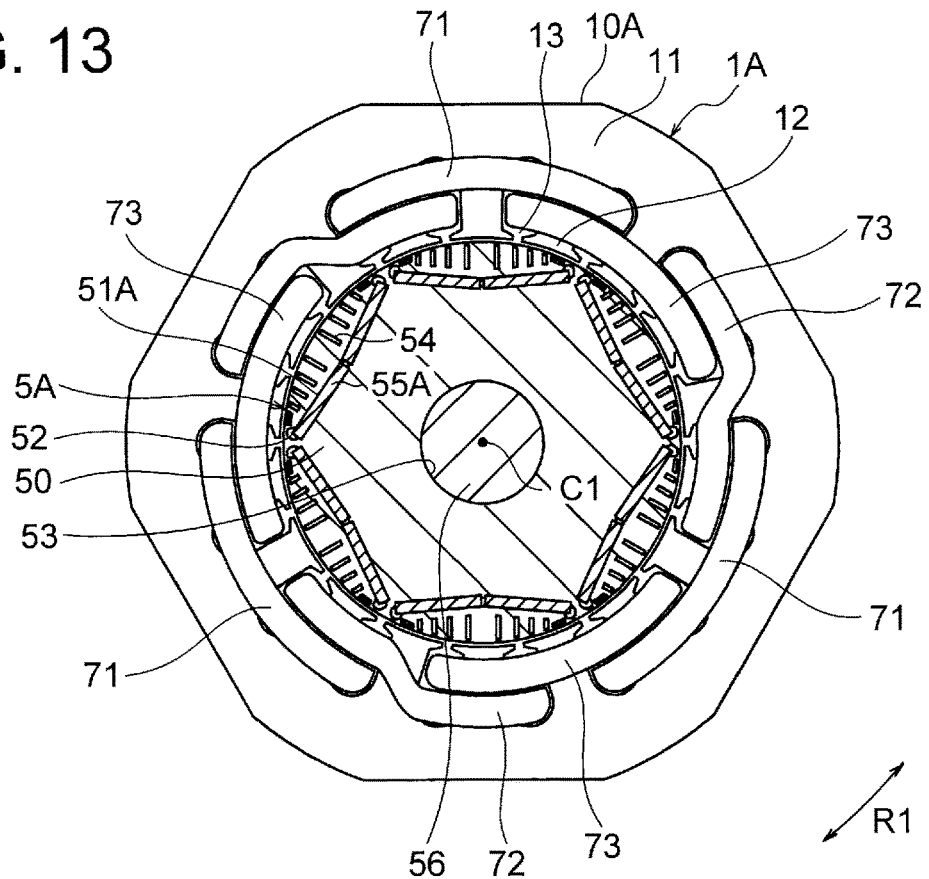
FIG. 13 is a cross-sectional view illustrating a motor of Comparative Example 1.

FIG. 13 is a diagram illustrating a motor of Comparative Example 1. The motor of Comparative Example 1 has a stator 1A and a rotor 5A rotatably provided on an inner side of the stator 1A.

The rotor 5A has a rotor core 50. The rotor core 50 has six magnet insertion holes 51A along the outer circumference of the rotor core 50, has a flux barrier 52 on each of both sides of the magnet insertion hole 51A in the circumferential direction, and has the shaft hole 53 at the center of the rotor core 50 in the radial direction. Each magnet insertion hole 51A has a V shape with its center in the circumferential direction protruding inward in the radial direction. Two permanent magnets 55 are disposed in each magnet insertion hole 51A. A plurality of slits 54 are formed on the outer side in the radial direction with respect to the magnet insertion holes 51A of the rotor core 50. The shaft 56 is fixed to the shaft hole 53.

The stator 1A has a stator core 10A, U-phase winding portions (a U-phase coil), V-phase winding portions 72 (a V-phase coil), and W-phase winding portions 73 (a W-phase coil), all of which are wound on the stator core 10A. The stator core 10A has 18 teeth 12 in the circumferential direction and 18 slots 13.

The U-phase winding portions 71 are arranged every six slots in the circumferential direction. The number of U-phase winding portions 71 is three. Each U-phase winding portion 71 is wound to span three teeth 12. A coil pitch of the U-phase winding portions 71 is 60 degrees (mechanical angle), i.e., three slots. The W-phase winding portions 73 are located on the inner side in the radial direction with respect to the U-phase winding portions 71. The W-phase winding portions 73 are arranged every six slots in the circumferential direction. The number of W-phase winding portions is three. Each W-phase winding portion 72 is wound to span three teeth 12. A coil pitch of the W-phase portions 72 is 60 degree (mechanical angle), i.e., three slots.

The V-phase winding portions 72 are arranged every six slots in the circumferential direction. The number of V-phase winding portions 71 is three. Each V-phase winding portion 72 is wound to span three teeth 12. A coil pitch of the V-shaped winding portions 72 is 60 degrees (mechanical angle), i.e., three slots. Each V-phase winding portion 72 extends from the inner side of the U-phase winding portion 71 in the radial direction to the outer side of the W-phase winding portion 73 in the radial direction.

In Comparison Example 1, the number of slots is 18, the number of poles is six, and the number of phases is three. Thus, the number of slots per phase per pole is 1. However, since the number of phases is three and the number of winding portions 71 to 73 is nine, the number of winding portions per phase is as low as three. Thus, the coil ends of each winding portion increase in size. As a result, the circumference length of each winding portion increases, and the electrical resistance (i.e., loss) increases, which reduces the motor efficiency.

Figure 14:
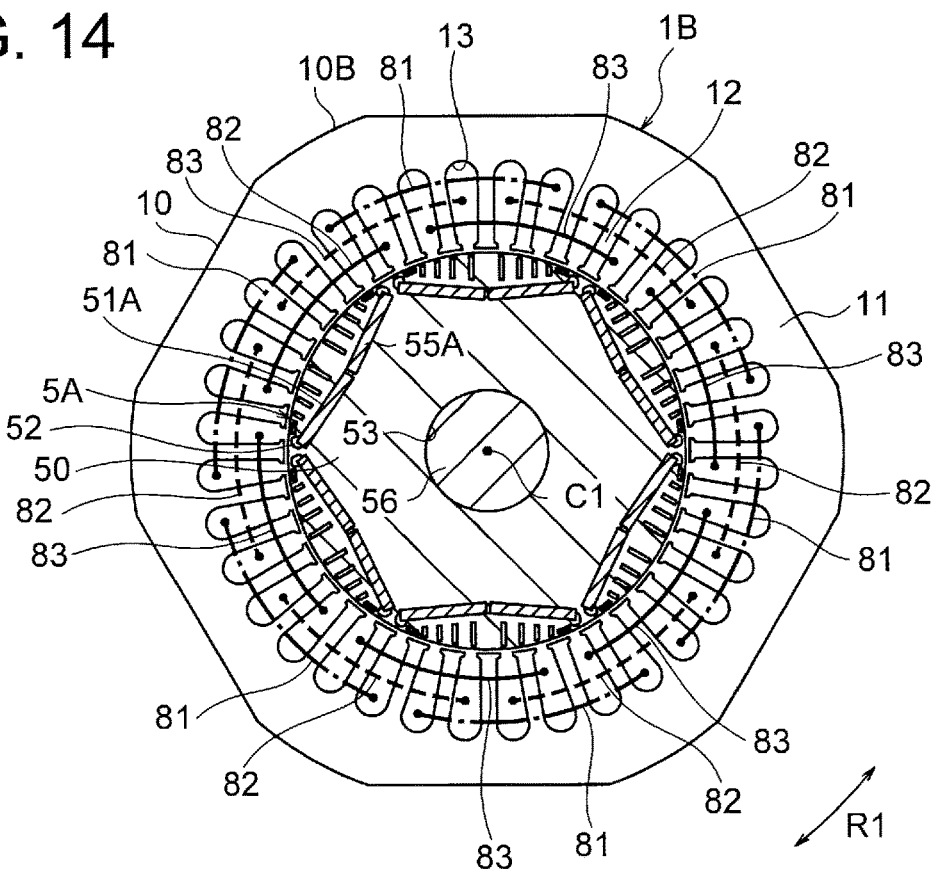
FIG. 14 is a cross-sectional view illustrating a motor of Comparative Example 2.

FIG. 14 is a diagram illustrating a motor of Comparative Example 2. The motor of Comparative Example 2 has a stator 1B and a rotor 5A rotatably provided on an inner side of the stator 1B. The configuration of the rotor 5A is the same as that of Comparative Example 1 illustrated in FIG. 13.

The stator 1B has a stator core 10B, U-phase winding portions (a U-phase coil), V-phase winding portions 82 (a V-phase coil), and W-phase winding portions 83 (a W-phase coil), all of which are wound on the stator core 10B. The stator core 10B has 36 teeth 12 in the circumferential direction and 36 slots 13.

The U-phase winding portions 81 are arranged every six slots in the circumferential direction. The number of U-phase winding portions 81 is six. Each U-phase winding portion 81 spans five teeth 12. A coil pitch of the U-phase winding portions 81 corresponds to five slots. The V-phase winding portions 82 are disposed on the inner side in the radial direction with respect to the U-phase winding portions 81, and the W-phase winding portions 83 are disposed on the inner side in the radial direction with respect to the V-phase winding portions 82. Both the V-phase winding portions 82 and the W-phase winding portions 83 are wound in the same manner as the U-phase winding portions 81.

In Comparison Example 2, the number of slots is 36, the number of poles is six, and the number of phases is three, so that the number of slots per phase per pole is 2. Since the number of winding portions per phase is as large as 12, the coil ends can be reduced in size. However, the number of slots per pole is six, whereas the coil pitch of the winding portions 81 to 83 is five slots, so that a winding factor Kw is smaller than 1. When the winding factor Kw is smaller than 1, the usage efficiency of magnetic flux of the permanent magnets 55 in the rotor 5 is reduced.

Figure 15:
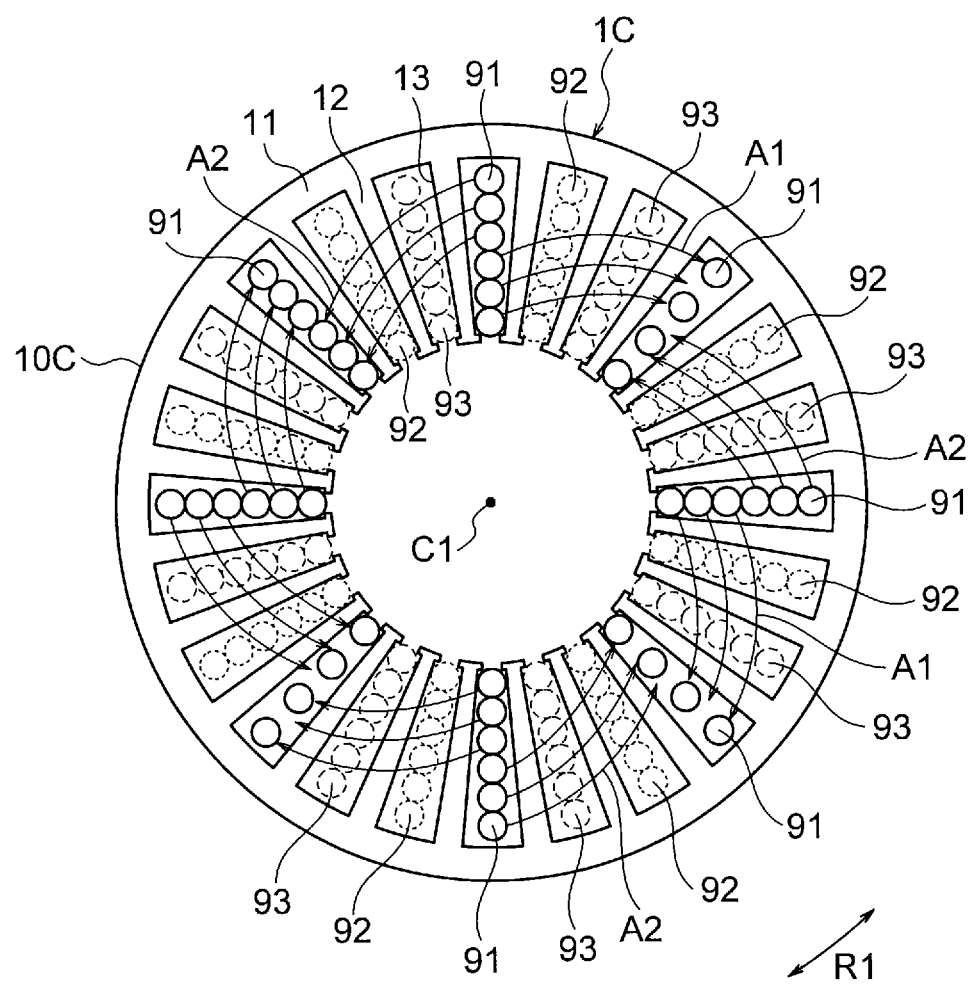
FIG. 15 is a schematic diagram illustrating a stator of a motor of Comparative Example 3.

FIG. 15 is a diagram illustrating a stator 1C of a motor of Comparative Example 3. The stator 1C of Comparative Example 3 has a stator core 10C, U-phase winding portions 91 (i.e., a U-phase coil), V-phase winding portions 92 (i.e., a V-phase coil), and W-phase winding portions 93 (i.e., a W-phase coil), all of which are wound on the stator core 10C. The stator core 10C has 24 teeth 12 and 24 slots 13 in the circumferential direction.

The U-phase winding portions 91 are inserted every three slots in the circumferential direction. Similarly, the V-phase winding portions 92 are inserted every three slots in the circumferential direction, and the W-phase winding portions 93 are also inserted every three slots in the circumferential direction.

The U-phase winding portions 91, the V-phase winding portions 92, and the W-phase winding portions 93 are wound by lap winding. More specifically, each U-phase winding portion 91 is wound spirally so as to pass through the inner side in the radial direction in the slot 13 and the outer side in the radial direction in a third slot 13 from the above-described slot 13. The V-phase winding portions 92 and the W-phase winding portions 93 are wound spirally in the same manner as the U-phase winding portions 91.

In Comparison Example 3, the number of slots is 24, the number of poles is eight, and the number of phases is three, so that the number of slots per phase per pole is 1. The number of winding portions per phase is as large as 12, and thus the coil ends can be reduced in size. The winding factor Kw is 1. However, the winding portions 91 to 93 are all wound spirally, a large number of insulating films need to be provided so as to insulate the winding portions 91 to 93 from each other. Further, the work to spirally wind the winding portions 91 to 93 is complicated, and thus the manufacturing cost is increased.

As compared with Comparative Examples 1 to 3, the operation of the motor 100 of the first embodiment will be described. In Comparative Example 1 (FIG. 13) described above, the number of winding portions per phase is small and thus the coil ends are enlarged. In contrast, in the first embodiment, each of the coils 21, 22, and 23 has the winding portions (for example, the U-phase winding portions 21A to 21F), the number of which is the same as the number of poles, and the winding portions are arranged dispersedly in the circumferential direction. Consequently, the coil ends can be reduced in size, and the use amount of copper wires can be reduced, so that the manufacturing cost can be reduced.

By reducing the size of the coil ends, the circumference length of each of the coils 21, 22, and 23 can be shortened, and thus the electrical resistance decreases and the loss is reduced. This can improve the motor efficiency.

In Comparative Example 2 (FIG. 14) described above, the winding factor Kw is less than 1, and thus the magnetic flux of the permanent magnets 55 in the rotor 5 cannot be efficiently used. Here, the winding factor Kw is expressed as the product of a short-pitch winding factor Kp and a distributed winding factor Kd (i.e., Kw=Kp×Kd). The short-pitch winding factor Kp is represented by the following equation (1) based on the number of poles P, the number of slots S, and the coil throw T (the number of teeth that the winding portion spans).

$$Kp=\sin\{180\times(P/S)\times(T/S)\} \qquad (1)$$

The distributed winding factor Kd is represented by the following equation (2) based on a phase difference $\alpha$ between the winding portions.

$$Kd=\cos(\alpha/2) \qquad (2)$$

In the first embodiment, the number of poles P is 3, the number of slots S is 18, and the coil throw T is 3, so that the short-pitch winding factor Kp is determined to be 1 by equation (1). Further, since the phase difference $\alpha$ between the winding portions is 0, the distributed winding factor Kd is determined to be 1 by equation (2). Consequently, the winding factor Kw, which is the product of Kp and Kd, is 1.

That is, the first embodiment achieves Kw=1 not only by disposing the U-phase coil 21, the V-phase coil 22, and the W-phase coil 23 in different positions in the radial direction, but also by inserting adjacent winding portions of the same phase (for example, adjacent U-phase winding portions 21A and 21B) in one slot 13. By setting the winding factor Kw to 1 in this way, the magnetic flux of the permanent magnets 55 in the rotor 5 can be used efficiently.

In Comparative Example 3 (FIG. 15) described above, the winding portions 91, 92, and 93 are wound spirally, and thus a complex winding work and a number of insulating films are needed. In contrast, in the first embodiment, the coils 21, 22, and 23 are each disposed annularly and are disposed in different positions in the radial direction, and thus the coils 21, 22, and 23 can be inserted into the slots 13 using the inserter. Thus, the manufacturing cost can be reduced.

As the coils 21, 22, and 23 are each disposed annularly and are disposed in different positions in the radial direction, the coils 21, 22, and 23 can be insulated from each other by disposing the insulating films 41 and 42 (FIG. 5) between the U-phase coil 21 and the V-phase coil 22 and between the V-phase coil 22 and the W-phase coil 23, respectively. In other words, the number of parts can be reduce and thus the manufacturing cost can be further reduced.

(Effects of Embodiment)

As described above, in the first embodiment, the coils 21, 22, and 23 are wound on the stator core 10 in the distributed winding, and the winding factor Kw is 1. Each of the coils 21, 22, and 23 has the winding portions (for example, the U-phase winding portions 21A to 21F), the number of which is the same as the number of poles. The first winding portion (for example, the U-phase winding portion 21A) and the second winding portion (for example, the U-phase winding portion 21B), which are adjacent to each other in the circumferential direction, are inserted into one slot 13, and extend from this slot 13 to both sides in the circumferential direction at each of the end surfaces 15 and 16 of the stator core 10. The coils 21, 22, and 23 are each annularly disposed and are disposed in different positions in the radial direction on the end surface of the stator core 10.

Since the coils 21, 22, and 23 are arranged dispersedly, the coil ends can be reduced in size, and thus it is possible to reduce the use amount of copper wires and reduce the manufacturing cost. Further, the reduction in the weight and size of the motor 100 can be achieved by reducing the size of the coil ends. Moreover, the electrical resistance can be suppressed to reduce the loss, and thus the motor efficiency can be improved. Furthermore, by setting the winding factor Kw to 1, the magnetic flux of the permanent magnets 55 in the rotor 5 can be used efficiently, and thus the motor efficiency can be further improved. In addition, the insertion of the coils 21, 22, and 23 into the slots 13 can be facilitated, and portions where the insulating films 41 and 42 are attached are few, so that the manufacturing cost can be further reduced.

The first wiring portions (for example, the U-phase winding portions 21A, 21C, and 21E) are disposed on the outer side in the radial direction with respect to the second wiring portions (for example, the U-phase winding portions 21B, 21D, and 21F), which makes it possible to first insert the first winding portions into the slots 13 and then insert the second winding portions into the slots 13. Thus, the interference between the winding portions in the slot 13 can be avoided.

Since the average circumference length of each of the U-phase winding portions 21B, 21D, and 21F (the second winding portions) is longer than the average circumference length of each of the U-phase winding portions 21A, 21C, and 21E (the first winding portions), the coil ends of the first and second wiring portions can be aligned annularly by deforming the first and second winding portions outward in the radial direction.

Further, since the space factor of the first winding portion (for example, the U-phase winding portion 21A, 21C, or 21E) in the slot 13 is smaller than the space factor of the second winding portion (for example, the U-phase winding portion 21B, 21D, or 21F) in the slot 13, the electrical resistances of the first and second winding portions which have different average circumference lengths can be made closer to each other.

At the end surfaces 15 and 16 of the stator core 10, the insulating film 41 is disposed between the U-phase coil 21 and the V-phase coil 22, and the insulating film 42 is disposed between the V-phase coil 22 and the W-phase coil 23. Thus, the coils 21, 22, and 23 can be insulated from each other with a small number of parts.

For a synchronous motor, the permanent magnets 55 in a non-magnetized state may be attached to the stator core 10, and then magnetization of the permanent magnets 55 may be performed by applying a magnetic field from the stator 1. By arranging the coils 21, 22, and 23 dispersedly, the electromagnetic force acting among the coils 21, 22, and 23 during the magnetization of the permanent magnets 55 can be reduced, and thus the damage (deformation or the like) to the coil ends can be suppressed.

Second Embodiment

Figure 16:
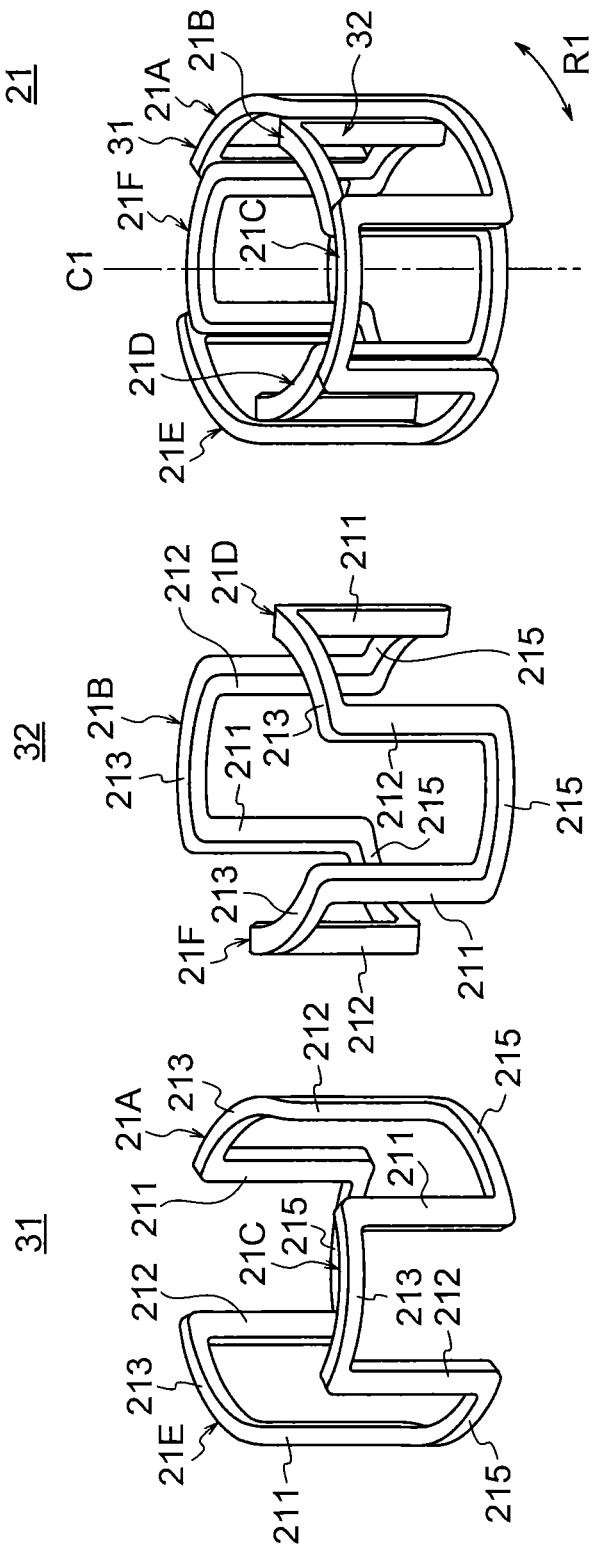
FIG. 16(A) is a perspective view illustrating a first winding portion of a U-phase coil of a second embodiment.
FIG. 16(B) is a perspective view illustrating a second winding portion of the U-phase coil.
FIG. 16(C) is a perspective view illustrating a combination of these winding portions.

Next, a second embodiment will be described. FIG. 16(A) is a perspective view illustrating the U-phase winding portions 21A, 21C, and 21E of the second embodiment, and FIG. 16(B) is a perspective view illustrating the U-phase winding portions 21B, 21D, and 21F of the second embodiment. FIG. 16(C) is a perspective view illustrating the U-phase wiring portions 21A to 21F.

As illustrated in FIG. 16(A), in the second embodiment, each of the U-phase winding portions 21A, 21C, and 21E has straight portions 211 and 212 and the coil end 213, and does not have the coil end 214 (FIG. 6(A)).

The straight portion 212 of the U-phase winding portion 21A and the straight portion 211 of the U-phase winding portion 21C are connected by a coil end 215, at an end (on the lower side in the figure) opposite to the coil end 213. Similarly, the straight portion 212 of the U-phase winding portion 21C and the straight portion 211 of the U-phase winding portion 21E are connected by a coil end 215, at an end opposite to the coil end 213. Further, the straight portion 212 of the U-phase winding portion 21E and the straight portion 211 of the U-phase winding portion 21A are connected by a coil end 215, at an end opposite to the coil end 213.

That is, the U-phase winding portions 21A, 21C, and 21E are connected in series in a wave shape to constitute a coil segment 31 as a first segment. In other words, the coil segment 31 is formed by connecting the winding portions (i.e., the U-phase winding portions 21A, 21C, and 21E), the number of which is half the number of poles, in the wave shape.

As illustrated in FIG. 16(B), each of the U-phase winding portions 21B, 21D, and 21F has the straight portions 211 and 212 and the coil end 213, and does not have the coil end 214 (FIG. 6(B)).

The straight portion 212 of the U-phase winding portion 21B and the straight portion 211 of the U-phase winding portion 21D are connected by a coil end 215, at an end (on the lower side in the figure) opposite to the coil end 213. Similarly, the straight portion 212 of the U-phase winding portion 21D and the straight portion 211 of the U-phase winding portion 21F are connected by a coil end 215, at an end opposite to the coil end 213. Further, the straight portion 212 of the U-phase winding portion 21F and the straight portion 211 of the U-phase winding portion 21B are connected by a coil end 215 at an end opposite to the coil end 213.

That is, the U-phase winding portions 21B, 21D, and 21F are connected in series in the wave shape to constitute a coil segment 32 as a second segment. In other words, the coil segment 32 is formed by connecting the winding portions (i.e., the U-phase winding portions 21B, 21D, and 21F), the number of which is half the number of poles, in the wave shape.

The U-phase coil 21 illustrated in FIG. 16(C) is obtained by combining the coil segment 31 illustrated in FIG. 16(A) and the coil segment 32 illustrated in FIG. 16(B). In the U-phase coil 21, as in the first embodiment, the U-phase winding portions 21A to 21F are arranged at intervals of 60 degrees in the circumferential direction.

Figure 17:
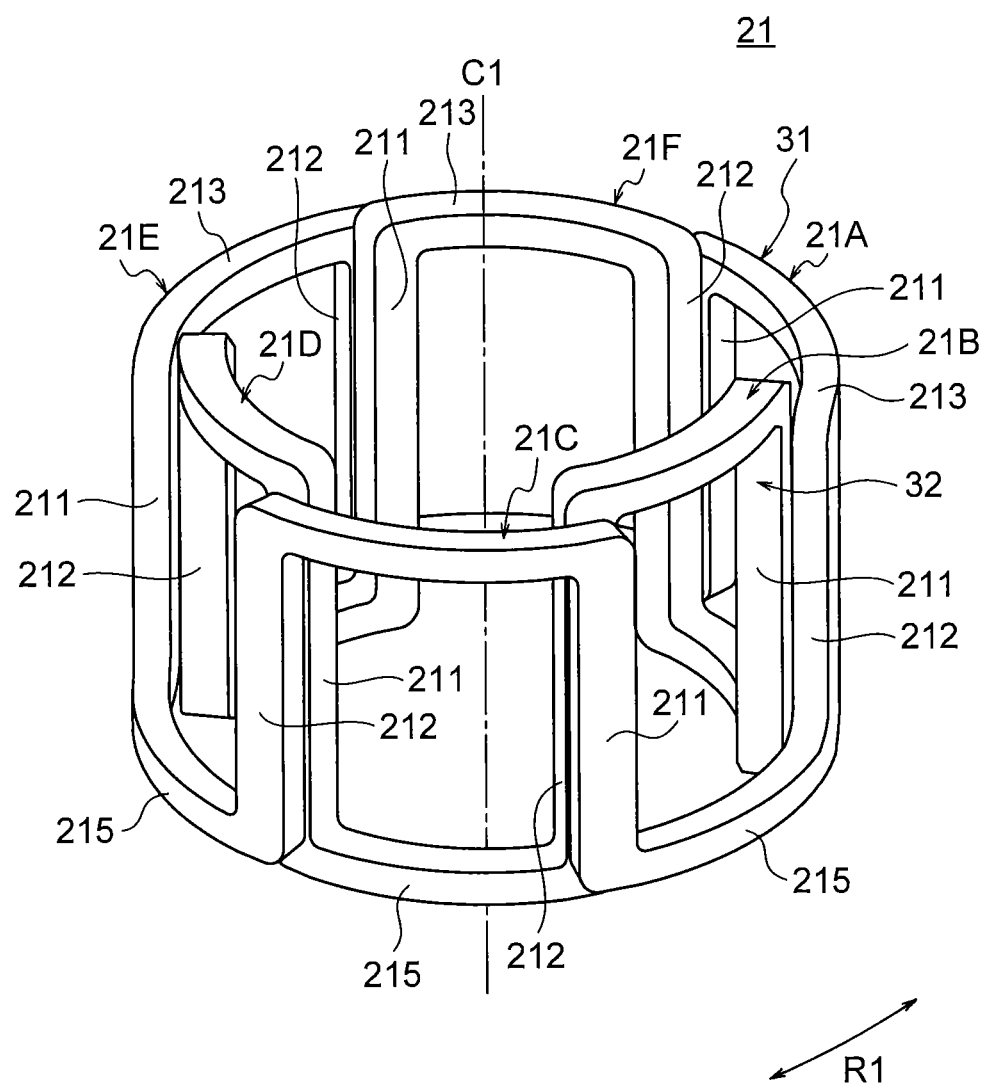
FIG. 17 is a perspective view illustrating the U-phase coil of a stator of the second embodiment.

FIG. 17 is a perspective view of the U-phase coil 21 obtained in this way. In the U-phase coil 21, the coil segment (i.e., the U-phase winding portions 21A, 21C, and 21E) is located on the outer side in the radial direction with respect to the coil segment 32 (i.e., the U-phase winding portions 21B, 21D, and 21F).

The coil end 213 of the U-phase winding portion 21A faces the coil end 215 between the U-phase winding portions 21F and 21B in the axial direction. Similarly, the coil end 213 of the U-phase winding portion 21B faces the coil end 215 between the U-phase winding portions 21A and 21C in the axial direction. The coil end 213 of the U-phase winding portion 21C faces the coil end 215 between the U-phase winding portions 21B and 21D in the axial direction. The coil end 213 of the U-phase winding portion 21D faces the coil end 215 between the U-phase winding portions 21C and 21E in the axial direction. The coil end 213 of the U-phase winding portion 21E faces the coil end 215 between the U-phase winding portions 21D and 21F in the axial direction. The coil end 213 of the U-phase winding portion 21F faces the coil end 215 between the U-phase winding portions 21E and 21A in the axial direction.

When the U-phase coil 21 is inserted into the slots 13 of the stator core 10, the state illustrated in FIG. 4 described above is obtained. That is, the U-phase winding portions 21A to 21F of the U-phase coil 21 are arranged every three slots in the circumferential direction. Each of the U-phase winding portions 21A to 21F is wound to span three teeth 12. A coil pitch is 60 degrees (mechanical angle), i.e., three slots.

The U-phase winding portions adjacent to each other in the circumferential direction (for example, the U-phase winding portion 21A and the U-phase winding portion 21B) have the straight portions (for example, the straight portion 212 of the U-phase winding portion 21A and the straight portion 211 of the U-phase winding portion 21B) inserted into the same slot 13, and the coil ends 213 extend from this slot 13 to both sides in the circumferential direction.

Although FIGS. 16(A) to 16(C) and FIG. 17 illustrate the U-phase coil 21, each of the V-phase coil 22 and the W-phase coil 23 is composed of two coil segments 31 and 32 in a similar manner to the U-phase coil 21. As described in the first embodiment, the V-phase coil 22 is disposed on the inner side in the radial direction with respect to the U-phase coil 21, and the W-phase coil 23 is disposed on the inner side in the radial direction with respect to the V-phase coil 22. Both the number of slots per phase per pole and the winding factor Kw are as described in the first embodiment.

In the second embodiment, since each of the coils 21, 22, and 23 is composed of two coil segments 31 and 32, the work to insert the coils 21, 22, and 23 into the slots 13 of the stator core 10 is facilitated, as compared with the case where six winding portions of each of the coils 21, 22, and 23 are individually handled.

Figure 18A:
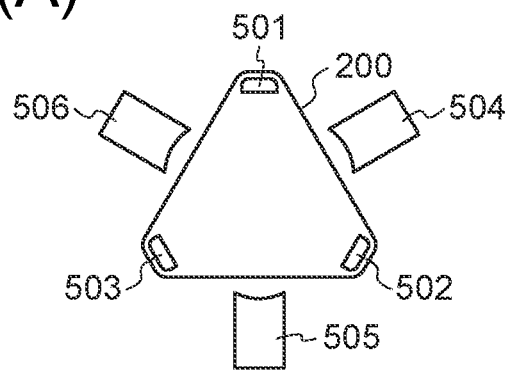
FIGS. 18(A) to 18(C) are schematic diagrams for explaining a method of forming coil segments of the second embodiment.
Figure 18B:
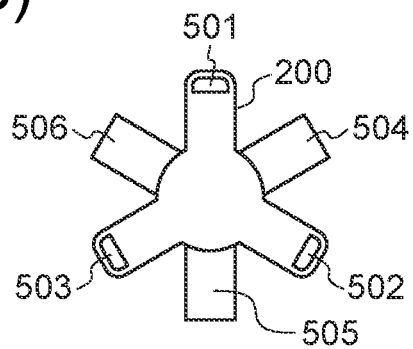
Figure 18C:
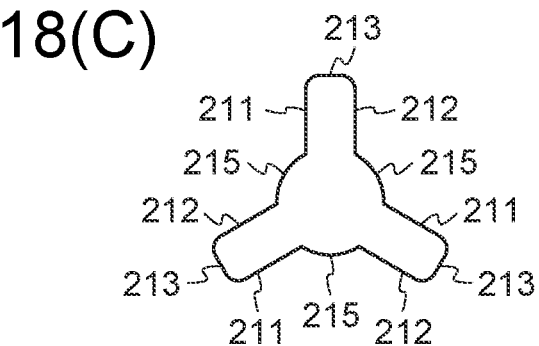

FIGS. 18(A) to 18(C) are schematic diagrams illustrating a method of forming the coil segment 31. As shown in FIG. 18(A), an annular coil 200, which is a bundle of copper wires serving as the coil segment 31, is stretched over three frame portions 501, 502, and 503 arranged at positions corresponding to three vertices of an equilateral triangle.

A pressing portion 504 is disposed so as to face the annular coil 200 between the frames 501 and 502. Similarly, a pressing portion 505 is disposed so as to face the annular coil 200 between the frames 502 and 503, and a pressing portion 506 is disposed so as to face the annular coil 200 between the frames 503 and 501.

Each of the pressing portions 504, 505, and 506 has an arc-shaped concave surface (referred to as a tip end surface) on the annular coil 200 side. The pressing portions 504, 505, and 506 are configured to be movable toward a center position of the triangle having three vertices at the frames 501, 502, and 503.

As shown in FIG. 18(B), when the pressing portions 504, 505, and 506 are moved toward the center of the triangle, the annular coil 200 is pressed by the pressing portions 504, 505, and 506 and recessed to the inner circumferential side, so that the annular coil 200 is formed into a star shape.

That is, the annular coil 200 is formed into the star shape that includes three outer peripheral portions held by the frame portions 501, 502, and 503, three inner peripheral portions pressed by the pressing portions 504, 505, and 506, and six straight portions each located between these outer and inner peripheral portions.

Thereafter, the pressing portions 504, 505, and 506 are separated from the annular coil 200, and the annular coil 200 is detached from the frames 501, 502, and 503, so that a star-shaped coil is obtained as illustrated in FIG. 18(C). The star-shaped coil includes the three outer peripheral portions (i.e., coil ends 213), the three inner peripheral portions (i.e., coil ends 215), and the six straight portions (i.e., the straight portions 211 and 212) between the outer and inner peripheral portions.

The coil segment 31 shown in FIG. 16(A) is obtained by bending the straight portions (i.e., the straight portions 211 and 212) of the star-shaped coil so that the inner peripheral portions (i.e., the coil ends 215) are located at the bottom. The coil segment 32 illustrated in FIG. 16(B) is formed in the same manner.

Next, a manufacturing method of the stator 1 of the second embodiment will be described. The stator 1 of the second embodiment is the same as the stator 1 of the first embodiment except for the coil 2, and thus the figures of the first embodiment are referred as needed.

Figure 19:
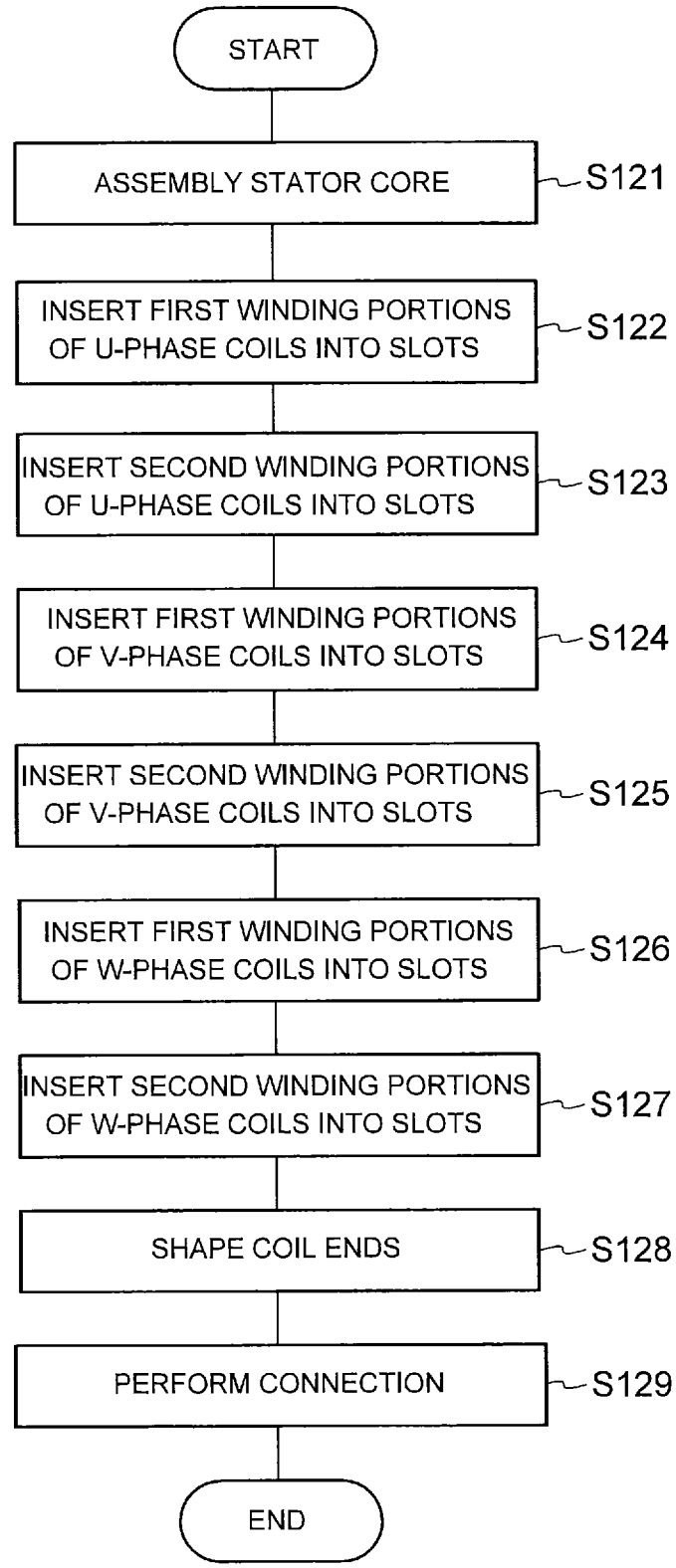
FIG. 19 is a flowchart illustrating a manufacturing method of the stator of the second embodiment.

FIG. 19 is a flowchart illustrating a manufacturing process of the stator 1 of the second embodiment. First, a plurality of electromagnetic steel sheets are stacked in the axial direction and integrally fixed together by crimping or the like to thereby obtain the stator core 10, as described in the first embodiment (step S121).

Then, the coil segment 31 including the U-phase winding portions 21A, 21C, and 21E (the first winding portions) are inserted into the slots 13 of the stator core 10 (step S122). The coil ends 213 of the U-phase winding portions 21A, 21C, and 21E are deformed outward in the radial direction.

Then, the coil segment 32 including the U-phase winding portions 21B, 21D, and 21F (the second winding portions) are inserted into the slots 13 of the stator core 10 (step S123). The coil ends 213 of the U-phase winding portions 21B, 21D, and 21F are deformed outward in the radial direction. Subsequently, the insulating film 41 (FIG. 1) is disposed on the inner side of the U-phase winding portions 21A to 21F in the radial direction.

Then, the coil segment 31 including the V-phase winding portions 22A, 22C, and 22E (the first winding portions) are inserted into the slots 13 of the stator core 10 (step S124). The coil ends 223 (see FIG. 11(C)) of the V-phase winding portions 22A, 22C, and 22E are deformed outward in the radial direction.

Then, the coil segment 32 including the V-phase winding portions 22B, 22D, and 22F (the first winding portions) are inserted into the slots 13 of the stator core 10 (step S125). The coil ends 223 (see FIG. 11(D)) of the V-phase winding portions 22B, 22D, and 22F are deformed outward in the radial direction. Subsequently, the insulating film 42 (FIG. 5) is disposed on the inner side of the V-phase winding portions 22A to 22F in the radial direction.

Then, the coil segment 31 including the W-phase winding portions 23A, 23C, and 23E (the first winding portions) are inserted into the slots 13 of the stator core 10 (step S126). The coil ends 234 (see FIG. 11(E)) of the W-phase winding portions 23A, 23C, and 23E are deformed outward in the radial direction.

Then, the coil segment 32 including the W-phase winding portions 23B, 23D, and 23F (second winding portions) are inserted into the slots 13 of the stator core 10 (step S127). The coil ends 234 (see FIG. 11(F)) of the W-phase winding portions 23B, 23D, and 23F are deformed outward in the radial direction. As above, the insertion of the U-phase coil 21, the V-phase coil 22, and the W-phase coil 23 into the slots 13 of the stator core 10 is completed.

Subsequently, as described in the first embodiment, the coil ends 213, 223, and 233 of the coils 21, 22, and 23 are shaped (step S128). Then, the U-phase coil 21, the V-phase coil 22, and the W-phase coil 23 are electrically connected (step S129). Consequently, the assembling of the stator 1 is completed.

The motor of the second embodiment is configured in a similar manner to the motor 100 of the first embodiment except for the configuration of the coils 21, 22, and 23.

As described above, in the second embodiment, the U-phase coil 21 includes the coil segment 31 in which the U-phase winding portions 21A, 21C, and 21E, the number of which is half the number of magnetic poles, are connected in the wave shape, and the coil segment 32 in which the U-phase winding portions 21B, 21D, and 21F are connected in the wave shape. The V-phase coil 22 and the W-phase coil 23 are configured in the same manner as the U-phase coil 21. Thus, the work to insert the U-phase coil 21, the V-phase coil 22, and the W-phase coil 23 into the slots 13 can be facilitated, and the time required for the work can be reduced.

In FIGS. 16(A) to 16(C) and FIG. 17, the average circumference length of each of the U-phase winding portions 21A, 21C, and 21E (the coil segment 31) and the average circumference length of each of the U-phase winding portions 21B, 21D, and 21F (the coil segment 32) are the same, but as described in the first embodiment, the average circumference length of each of the U-phase winding portions 21A, 21C, and 21E may be longer than the average circumference length of each of the U-phase winding portions 21B, 21D, and 21F.

Third Embodiment

Figure 20:
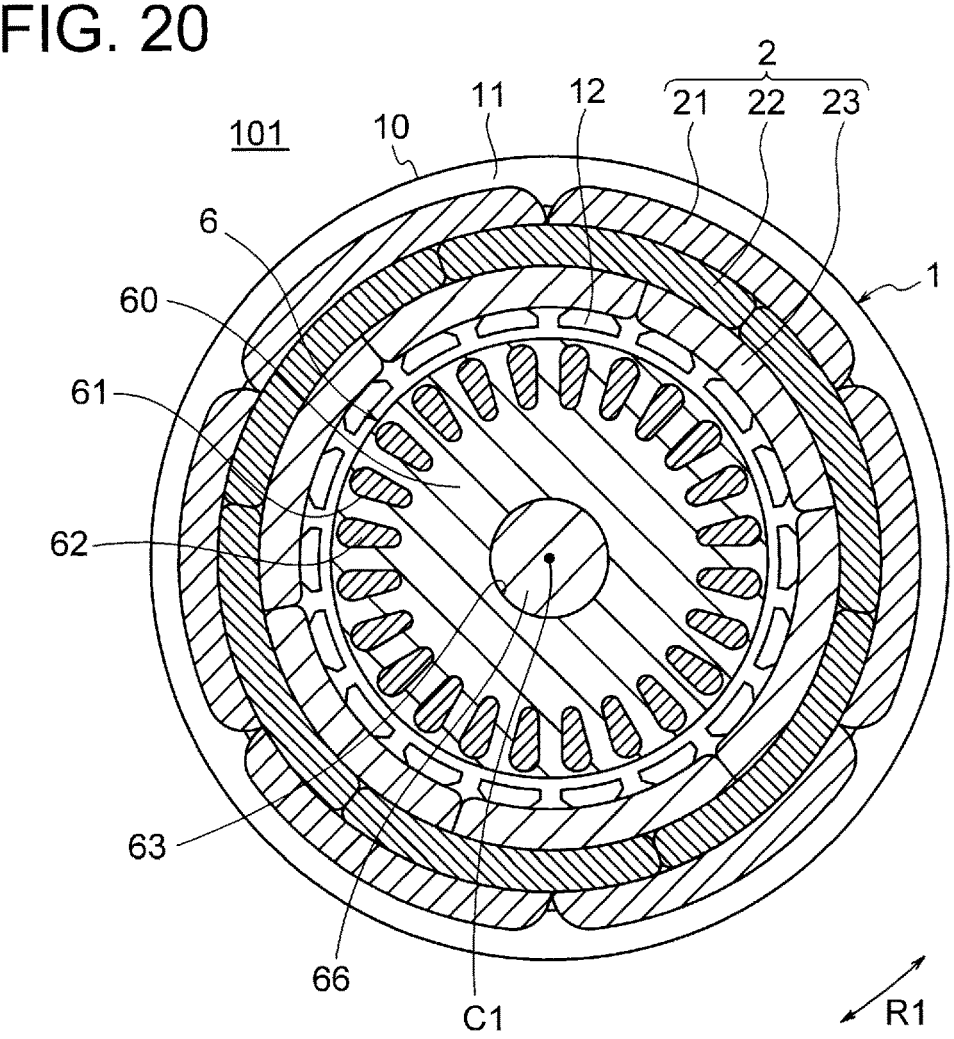
FIG. 20 is a cross-sectional view illustrating a motor of a third embodiment.

Next, a third embodiment will be described. FIG. 20 is a cross-sectional view illustrating a motor 101 of the third embodiment. The motor 101 of the third embodiment is an induction motor and differs from the motor of the first embodiment in the configuration of a rotor 6. A stator 1 of the motor 101 of the third embodiment is the same as the stator 1 of the first embodiment.

The rotor 6 includes a rotor core 60 having a plurality of slots 61, a shaft 66 which is a rotation shaft, and rotor bars 62 inserted into the slots 61 of the rotor core 60.

The rotor core 60 is composed of electromagnetic steel sheets, each having a thickness of, for example, 0.1 mm to 0.7 mm, which are stacked in the axial direction and integrally fixed together by crimping or the like. The rotor core 60 has a shaft hole 63 formed at its center in the radial direction. The shaft 66 is fixed to the shaft hole 63. An axis C1 which is a central axis of the shaft 66 serves as the rotation axis of the rotor 6.

The rotor core 60 is formed annularly about the axis C1. The plurality of slots 61 (also referred to as rotor slots) are formed at equal intervals in the circumferential direction along the outer circumference of the rotor core 60. The number of slots 61 is 24 in this example, but is not limited thereto. The slots 61 pass through the rotor core 60 in the axial direction.

Figure 21:
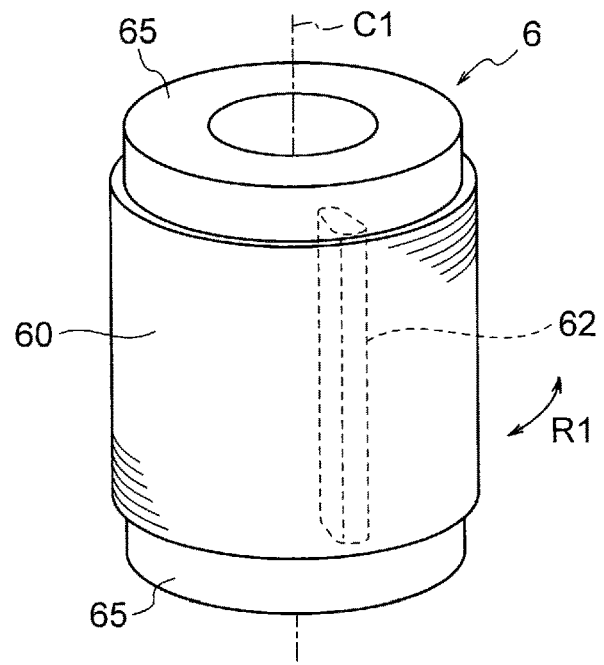
FIG. 21 is a perspective view illustrating a rotor of the motor of the third embodiment.

FIG. 21 is a perspective view illustrating the rotor 6. The rotor 6 has a pair of end rings 65, i.e., one end ring 65 on each of both ends of the rotor core 60 in the axial direction. The end rings 65 are connected to both ends of each rotor bar 62 in the axial direction, and are formed integrally with the rotor bars 62. The rotor bars 62 and the end rings 65 constitute a squirrel cage secondary conductor.

The rotor bars 62 and the end rings 65, which constitute the squirrel cage secondary conductor, are made of a non-magnetic conductive material such as, for example, aluminum. The rotor bars 62 and the end rings 65 are formed by casting aluminum at both ends of the rotor core 60 and into the slots 61. Copper may be used instead of aluminum. In FIG. 21, only a single rotor bar 62 is illustrated using a dashed line.

When the magnetic flux of the stator 1 interlinks with the rotor bar 62 of the rotor 6, a secondary current is generated in the rotor bar 62. This secondary current and the magnetic flux of the stator 1 generate a torque that rotates the rotor 6.

The stator 1 has the configuration described in the first embodiment and the coil ends are small, and thus the manufacturing cost of the motor 101 can be reduced. Since the coil ends are small, the electrical resistance is reduced and the loss is reduced, so that the motor efficiency can be improved. Furthermore, the reduction in the weight and size of the motor 101 can be achieved.

The coils 21, 22, and 23 (coil segments 31 and 32) described in the second embodiment may be applied to the motor 101 of the third embodiment.

As described above, in the third embodiment, the stator 1 of the first or second embodiment is used in the motor 101 which is an induction motor. Thus, the manufacturing cost of the motor 101 can be reduced, the motor efficiency can be improved, and the weight and size of the motor 101 can be reduced.

In the above-described first to third embodiments, the U-phase coil 21 is located outermost in the radial direction while the W-phase coil 23 is located innermost in the radial direction (see FIG. 4), but the arrangement of coils is not limited to such an example.

Further, in the above-described first to third embodiments, three-phase coils composed of the U-phase coil 21, the V-phase coil 22, and the W-phase coil 23 have been described, but the coils are not limited to the three-phase coils, but may be two-phase coils, for example.

(Compressor)

Figure 22:
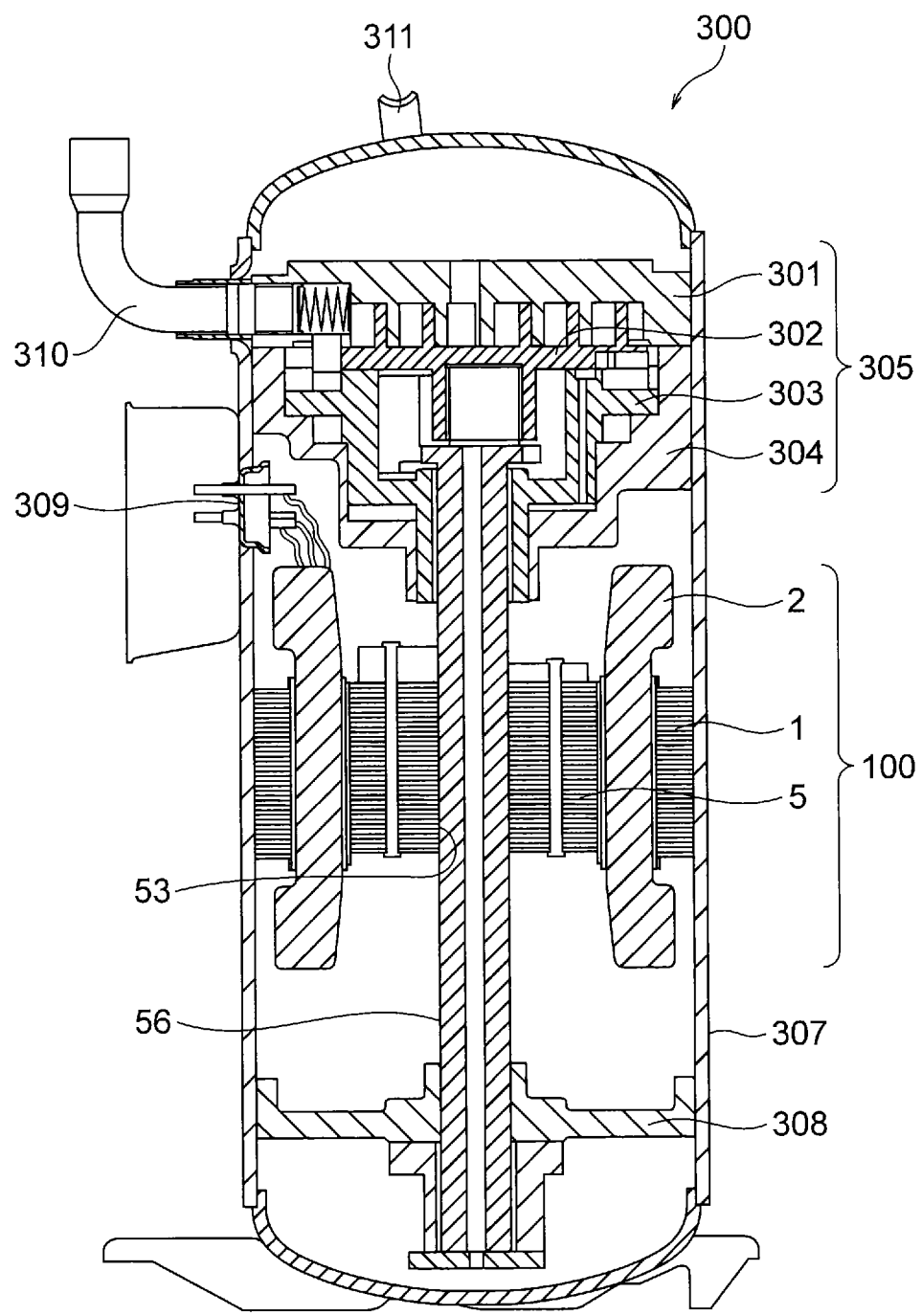
FIG. 22 is a longitudinal cross-sectional view illustrating a compressor to which the motor of any one of the first to third embodiments is applicable.

Next, the compressor 300 to which the motor described in each embodiment is applicable will be described. FIG. 22 is a cross-sectional view illustrating the compressor 300. The compressor 300 is a scroll compressor and includes a closed container 307, a compression mechanism 305 disposed in the closed container 307, the motor 100 that drives the compression mechanism 305, the shaft 56 connecting the compression mechanism 305 with the motor 100, and a subframe 308 that supports a lower end of the shaft 56 (i.e., an end of the shaft opposite to the compression mechanism 305).

The compression mechanism 305 includes a fixed scroll 301 having a spiral portion, a swing scroll 302 having a spiral portion forming a compression chamber between this spiral portion and the spiral portion of the fixed scroll 301, a compliance frame 303 that holds an upper end of the shaft 56, and a guide frame 304 that is fixed to the closed container 307 and holds the compliance frame 303.

A suction pipe 310 that penetrates the closed container 307 is press-fitted into the fixed scroll 301. The closed container 307 is provided with a discharge pipe 311 that allows high-pressure refrigerant gas discharged from the fixed scroll 301 to be discharged to the outside. The discharge pipe 311 communicates with a not shown opening provided between the compression mechanism 305 and the motor 100 in the closed container 307.

The motor 100 is fixed to the closed container 307 by fitting the stator 1 into the closed container 307. The configuration of the motor 100 is as described above. A glass terminal 309 for supplying electric power to the motor 100 is fixed to the closed container 307 by welding.

When the motor 100 rotates, the rotation of the motor 100 is transmitted to the swing scroll 302, and the swing scroll 302 swings. When the swing scroll 302 swings, a volume of the compression chamber formed between the spiral portion of the swing scroll 302 and the spiral portion of the fixed scroll 301 changes. Refrigerant gas is sucked therein through the suction pipe 310, compressed, and discharged through the discharge pipe 311.

The compressor 300 has the motor 100 described in the first embodiment. Thus, the manufacturing cost of the compressor 300 can be reduced, and the operating efficiency of the compressor 300 can be improved.

The slots 13 of the stator 1 in the motor 100 are densely filled with the coils 21, 22, and 23, and the flow paths for refrigerant and refrigerating machine oil have little unevenness. This makes the flow of refrigerant and refrigerating machine oil smooth, and further improves the operating efficiency of the compressor 300.

In the compressor 300, it is also possible to use the motor 101 described in the third embodiment instead of the motor 100. The coils 21, 22, and 23 (coil segments 31 and 32) described in the second embodiment may be applied.

The scroll compressor has been described as an example of the compressor, but the motor described in the embodiments may be applied to any compressor other than the scroll compressor.

(Air Conditioner)

Figure 23:
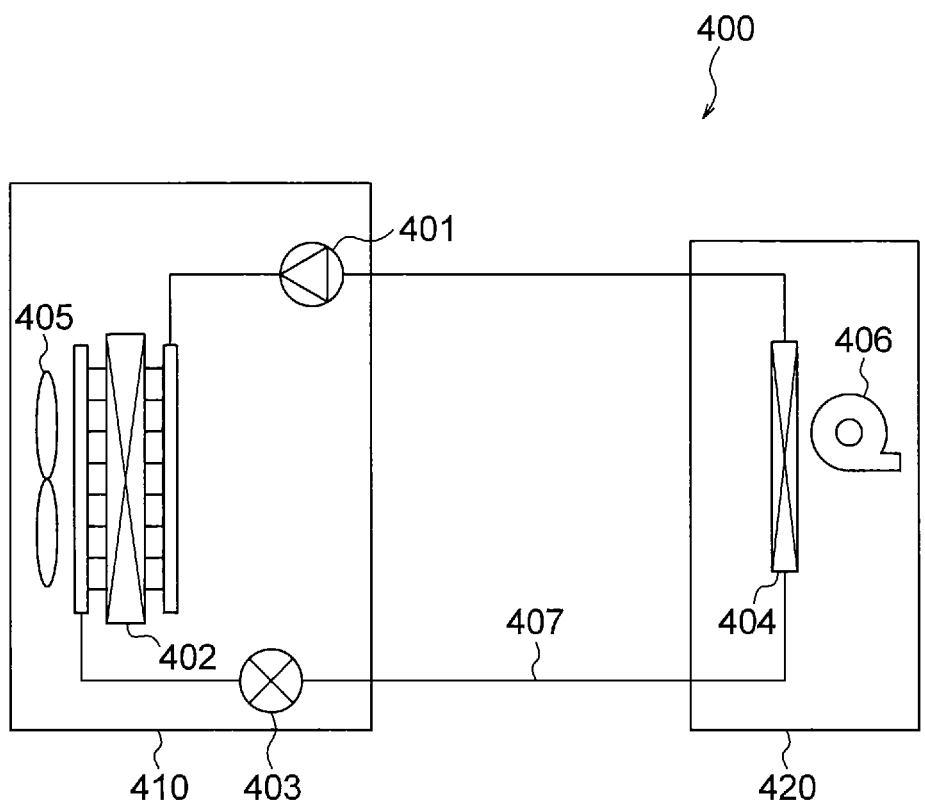
FIG. 23 is a diagram illustrating an air conditioner that includes the compressor illustrated in FIG. 22.

Next, an air conditioner 400 to which the motor described in each of the above-described embodiments is applicable will be described. FIG. 23 is a diagram illustrating the air conditioner 400 (a refrigeration cycle apparatus). The air conditioner 400 includes a compressor 401, a condenser 402, a throttle device (a decompression device) 403, and an evaporator 404. The compressor 401, the condenser 402, the throttle device 403, and the evaporator 404 are coupled together by a refrigerant pipe 407 to constitute a refrigeration cycle. That is, refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted by the compressor 300 illustrated in FIG. 22. The outdoor unit 410 is provided with an outdoor fan 405 that supplies outdoor air to the condenser 402. The evaporator 404 is provided in an indoor unit 420. The indoor unit 420 is provided with an indoor fan 406 that supplies indoor air to the evaporator 404.

The operation of the air conditioner 400 is as follows. The compressor 401 compresses sucked refrigerant, and sends out the compressed refrigerant. The condenser 402 exchanges heat between the refrigerant flowing in from the compressor 401 and the outdoor air to condense and liquefy the refrigerant, and sends out the liquefied refrigerant to the refrigerant pipe 407. The outdoor fan 405 supplies outdoor air to the condenser 402. The pressure or the like of the refrigerant flowing through the refrigerant pipe 407 is adjusted by changing the opening degree of the throttle device 403.

The evaporator 404 exchanges heat between the refrigerant brought into a low-pressure state by the throttle device 403 and the indoor air to cause the refrigerant to take heat from the indoor air and evaporate (vaporize), and then sends out the evaporated refrigerant to the refrigerant pipe 407. The indoor fan 406 supplies the indoor air to the evaporator 404. Thus, cooled air from which heat is removed in the evaporator 404 is supplied into the room.

By using the motor 100 described in the first or second embodiment or the motor 101 described in the third embodiment in the compressor 401 (i.e., the compressor 300), the manufacturing cost of the air conditioner 400 can be reduced, and the operating efficiency of the air conditioner 400 can be improved.

Although the desirable embodiments of the present invention have been specifically described, the present invention is not limited to the above-described embodiments, and various modifications and changes can be made to those embodiments without departing from the scope of the present invention.

What is claimed is:

1. A stator comprising:
   a stator core having a plurality of slots in a circumferential direction about an axis, the stator core having an end surface in a direction of the axis; and
   a first coil and a second coil each wound on the stator core in distributed winding, the first coil and the second coil being of different phases,
   wherein a winding factor is 1;
   wherein each of the first coil and the second coil has winding portions, the number of which corresponds to the number of poles;
   wherein the winding portions, the number of which corresponds to the number of poles, include a first winding portion and a second winding portion that are adjacent to each other in the circumferential direction;
   wherein the first winding portion and the second winding portion are inserted into one slot of the plurality of slots and extend from the one slot to both sides in the circumferential direction on the end surface;
   wherein the first coil and the second coil are annularly disposed in different positions in a radial direction about the axis on the end surface of the stator core; and
   wherein the first winding portion is disposed on an outer side in the radial direction with respect to the second winding portion.

2. The stator according to claim 1, wherein an average circumference length of the second winding portion is longer than an average circumference length of the first winding portion.

3. The stator according to claim 1, wherein a space factor of the first winding portion in the slot is smaller than a space factor of the second winding portion in the slot.

4. The stator according to claim 1, to wherein the winding portions, the number of which corresponds to the number of poles, include a first segment and a second segment, each of the first segment and the second segment being obtained by connecting the winding portions, the number of which is half the number of poles, in a wave shape, and
   wherein the first segment includes the first winding portion, and the second segment includes the second winding portion.

5. The stator according to claim 4, wherein the first segment is disposed on an outer side in the radial direction with respect to the second segment.

6. The stator according to claim 1, wherein an insulating film is disposed between the first coil and the second coil on the end surface of the stator core.

7. The stator according to claim 6, wherein the insulating film is disposed annularly about the axis.

8. The stator according to claim 1, wherein a value obtained by dividing the number of slots in the stator core by a product of the number of poles and the number of phases is 1.

9. The stator according to claim 1, further comprising a third coil of a different phase from each of the first coil and the second coil.

10. A motor comprising:
the stator according to claim 1; and
a rotor rotatably provided inside the stator.

11. The motor according to claim 10, wherein the motor is a synchronous motor.

12. The motor according to claim 10, wherein the motor is an induction motor.

13. A compressor comprising:
the motor according to claim 1; and
a compression mechanism driven by the motor.

14. An air conditioner comprising a compressor, a condenser, a decompression device, and an evaporator,
the compressor comprising a motor, and a compression mechanism driven by the motor,
the motor comprising:
the stator according to claim 1; and
a rotor rotatably provided inside the stator.

15. A manufacturing method of a stator, the method comprising the steps of:
preparing a stator core that has a plurality of slots in a circumferential direction about an axis, the stator core having an end surface in a direction of the axis;
attaching a first coil to the stator core so that a first winding portion and a second winding portion of the first coil are inserted into one slot of the plurality of slots and extend from the one slot to both sides in the circumferential direction on the end surface; and
attaching a second coil of a different phase from the first coil, to the stator core so that a first winding portion and a second winding portion of the second coil are inserted into another slot, which is different from the one slot, of the plurality of slots and extend from the another slot to both sides in the circumferential direction on the end surface,
wherein in the step of attaching the first coil to the stator core, the first winding portion of the first coil is disposed on an outer side in a radial direction about the axis with respect to the second winding portion of the first coil in the one slot;
wherein in the step of attaching the second coil to the stator core, the first winding portion of the second coil is disposed on an outer side in the radial direction with respect to the second winding portion of the second coil in the another slot; and
wherein the step of attaching the second coil to the stator core comprises attaching the second coil on an inner side in the radial direction with respect to the first coil.

16. The method for manufacturing a stator according to claim 15, wherein the step of attaching the first coil to the stator core comprises:
attaching the first winding portion of the first coil to the stator core; and
attaching the second winding portion of the first coil to an inner side of the first winding portion of the first coil in the radial direction on the stator core, and
wherein the step of attaching the second coil to the stator core comprises:
attaching the first winding portion of the second coil to the stator core; and
attaching the second winding portion of the second coil to an inner side of the first winding portion of the second coil in the radial direction on the stator core.

17. The method for manufacturing a stator according to claim 15, wherein the step of attaching the first coil to the stator core comprises:
attaching a first segment to the stator core, the first segment being obtained by connecting a plurality of the first winding portions of the first coil in a wave shape; and
attaching a second segment to an inner side of the first segment of the first coil in the radial direction on the stator core, the second segment being obtained by connecting a plurality of the second winding portions of the first coil in a wave shape, and
wherein the step of attaching the second coil to the stator core comprises:
attaching a first segment to the stator core, the first segment being obtained by connecting a plurality of the first winding portions of the second coil in a wave shape; and
attaching a second segment to an inner side of the first segment of the second coil in the radial direction on the stator core, the second segment being obtained by connecting a plurality of the second winding portions of the second coil in a wave shape.

* * * * *